United States Patent
Nakajima et al.

(10) Patent No.: US 12,534,656 B2
(45) Date of Patent: Jan. 27, 2026

(54) REFRIGERATOR OIL COMPOSITION AND MIXED COMPOSITION FOR REFRIGERATOR

(71) Applicant: IDEMITSU KOSAN CO., LTD., Chiyoda-ku (JP)

(72) Inventors: So Nakajima, Edogawa-ku (JP); Masaya Kubota, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 671 days.

(21) Appl. No.: 17/904,347

(22) PCT Filed: Feb. 19, 2021

(86) PCT No.: PCT/JP2021/006377
§ 371 (c)(1),
(2) Date: Aug. 16, 2022

(87) PCT Pub. No.: WO2021/167068
PCT Pub. Date: Aug. 26, 2021

(65) Prior Publication Data
US 2023/0076704 A1  Mar. 9, 2023

(30) Foreign Application Priority Data
Feb. 19, 2020 (JP) .................................. 2020-026355

(51) Int. Cl.
*C09K 5/04* (2006.01)

(52) U.S. Cl.
CPC ........ *C09K 5/045* (2013.01); *C09K 2205/122* (2013.01)

(58) Field of Classification Search
CPC ............ C10N 2040/30; C10N 2030/12; C10N 2030/06; C10N 2020/101; C10N 2030/02; C10M 171/008; C10M 2207/289; C10M 2209/1055; C10M 2201/087; C10M 2215/221; C10M 2223/041; C10M 2207/144; C10M 2209/108
See application file for complete search history.

(56) References Cited

U.S. PATENT DOCUMENTS

| | | | |
|---|---|---|---|
| 5,366,646 A | 11/1994 | Sato et al. | |
| 5,560,854 A | 10/1996 | Kaimai et al. | |
| 2005/0084390 A1* | 4/2005 | Ueno | C10M 171/008 417/313 |
| 2008/0110799 A1 | 5/2008 | Matsui et al. | |
| 2009/0277212 A1 | 11/2009 | Kaneko et al. | |
| 2009/0278097 A1 | 11/2009 | Leck et al. | |
| 2010/0029522 A1 | 2/2010 | Tokiai et al. | |
| 2010/0234256 A1 | 9/2010 | Sato et al. | |
| 2013/0098101 A1 | 4/2013 | Ishida | |
| 2014/0191154 A1* | 7/2014 | Minor | C08J 9/04 516/8 |
| 2015/0008359 A1 | 1/2015 | Matsumoto | |
| 2015/0048271 A1 | 2/2015 | Kaneko et al. | |
| 2016/0075928 A1 | 3/2016 | Mabuchi et al. | |
| 2016/0355717 A1 | 12/2016 | Fukushima et al. | |
| 2017/0335230 A1 | 11/2017 | Matsumoto | |

FOREIGN PATENT DOCUMENTS

| | | |
|---|---|---|
| CN | 101341234 A | 1/2009 |
| CN | 101535457 A | 9/2009 |
| CN | 101868522 A | 10/2010 |
| CN | 102971591 A | 3/2013 |
| CN | 104114668 A | 10/2014 |
| CN | 104169406 A | 11/2014 |
| CN | 104725222 A | 6/2015 |
| CN | 107109289 A | 8/2017 |
| EP | 0 415 626 A1 | 3/1991 |
| JP | 5-302094 A | 11/1993 |
| JP | 6-100881 A | 4/1994 |
| JP | 6-100882 | 4/1994 |

(Continued)

OTHER PUBLICATIONS

Combined Chinese Office Action and Search Report issued Sep. 6, 2023 in Chinese Patent Application No. 202180014924.5 (with unedited computer-generated English Translation), 18 pages.
Office Action issued Nov. 21, 2023, in corresponding Japanese Patent Application No. 2020-026355 (with English Translation), 5 pages.
Notice of Reasons for Refusal issued Jul. 4, 2023 in Japanese Patent Application No. 2020-026355 (with English machine translation), 14 pages.
Combined Chinese Office Action and Search Report issued Apr. 7, 2024, in corresponding Chinese Patent Application No. 202180014924.5 (with English Translation and English Translation of Category of Cited Documents), 11 pages.
European Office Action issued Dec. 3, 2024 in European Patent Application No. 21 757 222.1, 5 pages.

*Primary Examiner* — Vishal V Vasisth
(74) *Attorney, Agent, or Firm* — Oblon, McClelland, Maier & Neustadt, L.L.P.

(57) ABSTRACT

A mixed composition including a refrigerant including at least one unsaturated fluorinated hydrocarbon compound selected from the compound having a formula $C_xF_yH_z$, x is an integer of 2 to 6, y is an integer of 1 to 11, z is an integer of 1 to 11, and the compound has at least one unsaturated carbon-carbon bond, and a refrigerator oil including a base oil (A); a phosphorus-based extreme pressure agent (B); a decomposition inhibitor (C) that inhibits the decomposition of the unsaturated fluorinated hydrocarbon in the presence of an iron; and an antioxidant (D), wherein (C) controls the amount of fluorine in the refrigerator oil composition at 30 ppm by mass or less after mixing the refrigerator oil with R1234yf at a mass ratio of 1:1, and subjecting the mixture to an autoclave test at 175° C. for 336 hours with a metal catalyst including iron, copper, and aluminum.

13 Claims, No Drawings

(56) References Cited

FOREIGN PATENT DOCUMENTS

| | | |
|---|---|---|
| JP | 9-53086 A | 2/1997 |
| JP | 2006-503961 A | 2/2006 |
| JP | 2008-120908 A | 5/2008 |
| JP | 2012-12532 | 1/2012 |
| JP | 2016-56306 A | 4/2016 |
| JP | 2017-193598 A | 10/2017 |
| JP | 2019-34997 A | 3/2019 |
| KR | 10-2010-0091225 | 8/2010 |
| KR | 10-2014-0135192 | 11/2014 |
| WO | WO 2009/066722 A1 | 5/2009 |
| WO | WO 2012/001842 A1 | 1/2012 |
| WO | WO 2013/137112 A1 | 9/2013 |
| WO | WO 2019/219858 A1 | 11/2019 |
| WO | WO 2021/039249 | 3/2021 |

OTHER PUBLICATIONS

Extended European Search Report issued on Feb. 21, 2024 in European Patent Application No. 21757222.1, 8 pages.
European Office Action issued May 22, 2025 in European Patent Application No. 21757222.1, 3 pages.
International Search Report English Translation Issued Apr. 20, 2021, in PCT/JP2021/006377, filed on Feb. 19, 2021, 3 pages and International Search Report Japan Translation, therein, 4 pages.
Official communication issued on Oct. 30, 2025, in corresponding KR application 10-2022-7027767 with English translation provided by Global Dossier).

\* cited by examiner

REFRIGERATOR OIL COMPOSITION AND MIXED COMPOSITION FOR REFRIGERATOR

CROSS-REFERENCE TO RELATED APPLICATIONS

This application is a National Stage entry under 35 U.S.C. § 371 of PCT/JP2021/006377, filed on Feb. 19, 2021, and claims priority to Japanese Patent Application No. 2020-026355, filed on Feb. 19, 2020, the entire contents of which are incorporated herein by reference.

TECHNICAL FIELD

The present invention relates to a refrigerator oil composition and a mixed composition for a refrigerator.

BACKGROUND ART

A refrigerator, for example a compression refrigerator, generally includes at least a compressor, a condenser, an expansion mechanism (such as an expansion valve), and an evaporator, and has a structure in which a mixture of a refrigerant and a refrigerator oil composition (hereinafter also referred to as a "mixed composition for a refrigerator") circulates in a closed system.

Fluorinated hydrocarbon compounds with a low environmental load are becoming increasingly used in place of hydrochlorofluorocarbons (HCFCs) that have been commonly used as a refrigerant in a refrigerator such as a compression refrigerator. In particular, saturated fluorinated hydrocarbon compounds (Hydro-Fluoro-Carbons, hereinafter also referred to as "HFCs") such as 1,1,1,2-tetrafluoroethane (R134a), difluoromethane (R32), and 1,1-difluoroethane (R152a), are becoming used.

Further, the use of unsaturated fluorinated hydrocarbon compounds (Hydro-Fluoro-Olefins, hereinafter also referred to as "HFOs") such as 1,3,3,3-tetrafluoropropene (R1234ze), 2,3,3,3-tetrafluoropropene (R1234yf), and 1,2,3,3-tetrafluoropropene (R1234ye), which have a low global warming potential (GWP), is being studied (see, for example, patent document 1).

CITATION LIST

Patent Literature

Patent document 1: Published Japanese Translation No. 2006-503961 of the PCT International Publication

SUMMARY OF INVENTION

Technical Problem

However, the use of a refrigerant comprising an unsaturated fluorinated hydrocarbon compound (HFO) in a refrigerator has the problem of wear of a sliding portion made of iron, which is desired to be improved.

The present invention has been made to meet the desire. Thus, it is an object of the present invention to provide a refrigerator oil composition and a mixed composition for a refrigerator which, even when a refrigerant comprising an unsaturated fluorinated hydrocarbon compound (HFO) is used, ensure excellent wear resistance of a sliding portion made of iron.

Solution to Problem

The present inventors, through their intensive studies, have found that the above object can be achieved by a refrigerator oil composition which uses a phosphorus-based extreme pressure agent and a decomposition inhibitor that inhibits the decomposition of an unsaturated fluorinated hydrocarbon compound in the presence of iron, and which uses, as the decomposition inhibitor, a compound that satisfies particular conditions. The present invention has been accomplished based on this finding.

Thus, the present invention relates to the following [1] to [3].

[1] A refrigerator oil composition for use with a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bond], the composition comprising: a base oil (A); a phosphorus-based extreme pressure agent (B); a decomposition inhibitor (C) that inhibits the decomposition of the unsaturated fluorinated hydrocarbon compound in the presence of iron; and an antioxidant (D), wherein the decomposition inhibitor (C) is a compound which controls the amount of fluorine in the refrigerator oil composition at 30 ppm by mass or less after mixing the refrigerator oil composition and R1234yf at a mass ratio of 1:1, and subjecting the mixture to an autoclave test at 175° C. for 336 hours in the presence of a metal catalyst consisting of iron, copper, and aluminum.

[2] A mixed composition for a refrigerator, comprising: a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bond]; and the refrigerator oil composition as set forth in [1].

[3] A method for producing a refrigerator oil composition for use with a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bondl, the method comprising mixing a base oil (A), a phosphorus-based extreme pressure agent (B), a decomposition inhibitor (C) that inhibits the decomposition of the unsaturated fluorinated hydrocarbon compound in the presence of iron, and an antioxidant (D), wherein the decomposition inhibitor (C) is a compound which controls the amount of fluorine in the refrigerator oil composition at 30 ppm by mass or less after mixing the refrigerator oil composition and R1234yf at a mass ratio of 1:1, and subjecting the mixture to an autoclave test at 175° C. for 336 hours in the presence of a metal catalyst consisting of iron, copper, and aluminum.

Advantageous Effects of Invention

According to the present invention, it becomes possible to provide a refrigerator oil composition and a mixed composition for a refrigerator which, even when a refrigerant comprising an unsaturated fluorinated hydrocarbon compound (HFO) is used, ensure excellent wear resistance of an iron sliding portion.

DESCRIPTION OF EMBODIMENTS

Lower limit values and upper limit values, which are set forth herein in a stepwise manner with reference to preferable numerical ranges (e.g., content ranges), can be combined independently. For example, from the phrase "preferably 10 to 90, more preferably 30 to 60", the "preferable lower limit value (10)" and the "more preferable upper limit value (60)" can be combined into the range of "10 to 60".

A numerical range of "a lower limit to an upper limit" herein means the lower limit or more and the upper limit or less unless otherwise specified.

A numerical value found in Examples can be used herein as an upper limit value or a low limit value.

As used herein, the term "hydrocarbon group" refers to a group composed only of a carbon atom(s) and a hydrogen atom(s) unless otherwise specified. "Hydrocarbon group" includes an "aliphatic group" composed of a saturated or unsaturated straight chain or a saturated or unsaturated branched chain, an "alicyclic group" having at least one non-aromatic saturated or unsaturated carbon ring, and an "aromatic group" having at least one aromatic ring such as a benzene ring.

As used herein, "the number of ring-forming carbon atoms" refers to the number of carbon atoms constituting a ring in a compound having a structure in which atoms, including the carbon atoms, are bound in the shape of the ring. When the ring has a substituent, a carbon atom(s) contained in the substituent is not included in the ring-forming carbon atoms.

The number of ring-forming atoms refers to the number of atoms constituting a ring in a compound having a structure in which the atoms are bound in the shape of the ring. The ring-forming atoms do not include an atom(s) that does not constitute the ring (e.g., a hydrogen atom that terminates the bonding hand of an atom constituting the ring) or an atom(s) contained in a substituent when the ring has the substituent.

With reference to the expression "substituted or unsubstituted X group having a to b carbon atoms" as used herein, the "a to b carbon atoms" refer to the number of carbon atoms of the X group which is not substituted, and do not include the number of carbon atoms of a substituent when the X group has the substituent.

"Kinematic viscosity at 40° C." will be hereinafter also referred to as "40° C. kinematic viscosity".

[Embodiments of the Refrigerator Oil Composition of the Present Invention]

The refrigerator oil composition of the present invention is a refrigerator oil composition for use with a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bond], the composition comprising: a base oil (A); a phosphorus-based extreme pressure agent (B); a decomposition inhibitor (C) that inhibits the decomposition of the unsaturated fluorinated hydrocarbon compound in the presence of iron; and an antioxidant (D), wherein the decomposition inhibitor (C) is a compound which controls the amount of fluorine in the refrigerator oil composition at 30 ppm by mass or less after mixing the refrigerator oil composition and R1234yf at a mass ratio of 1:1, and subjecting the mixture to an autoclave test at 175° C. for 336 hours in the presence of a metal catalyst consisting of iron, copper, and aluminum.

The present inventors made a study of the reason why a sliding portion made of iron is likely to wear away when a refrigerant comprising an unsaturated fluorinated hydrocarbon compound (HFO) is used in a refrigerator, and considered that fluorine, which is generated on decomposition of the unsaturated fluorinated hydrocarbon compound in the presence of iron, will react with an iron sliding portion, causing wear of the sliding portion.

The present inventors, through their intensive studies, found that a refrigerator oil composition which uses the phosphorus-based extreme pressure agent (B) and the decomposition inhibitor (C) that inhibits the decomposition of an unsaturated fluorinated hydrocarbon compound in the presence of iron, and which uses, as the decomposition inhibitor (C), a compound that can controls the amount of fluorine in the refrigerator oil composition at the particular amount or less after mixing the refrigerator oil composition and R1234yf, and subjecting the mixture to the autoclave test, ensures excellent wear resistance of a sliding portion made of iron. The present inventors made further studies based on this finding and accomplished the present invention.

The terms "base oil (A)", "phosphorus-based extreme pressure agent (B)", "decomposition inhibitor (C)", and "antioxidant (D)" will be hereinafter also referred to as "component (A)", "component (B)", "component (C)", and "component (D)", respectively.

While the refrigerator oil composition according to an embodiment of the present invention may consist only of the component (A), the component (B), the component (C), and the component (D), the composition may also contain a component(s) other than the components (A) to (D) as long as the effect of the present invention is not impaired.

In the refrigerator oil composition according to an embodiment of the present invention, the total content of the component (A), the component (B), the component (C), and the component (D) is preferably 80% by mass to 100% by mass, more preferably 85% by mass to 100% by mass, and even more preferably 90% by mass to 100% by mass based on the total amount (100% by mass) of the refrigerator oil composition.

The components of the refrigerator oil composition of the present invention will now be described in detail.

<Base Oil (A)>

The refrigerator oil composition of the present invention contains the base oil (A).

In the refrigerator oil composition according to an embodiment of the present invention, the content of the base oil (A) is preferably 85.0% by mass or more, more preferably 90.0% by mass or more, and even more preferably 92.0% by mass or more based on the total amount (100% by mass) of the refrigerator oil composition, while it is preferably 99.0% by mass or less, more preferably 98.9% by mass or less, and even more preferably 98.8% by mass or less.

The upper limit values and the lower limit values of these numerical ranges can be combined arbitrarily. In particular, the content of the base oil (A) is preferably 85.0% by mass to 99.0% by mass, more preferably 90.0% by mass to 98.9% by mass, and even more preferably 92.0% by mass to 98.8% by mass.

A base oil, commonly used in a refrigerator oil composition, can be used as the base oil (A) without any particular limitation. For example, at least one selected from the group consisting of a synthetic oil and a mineral oil can be used as the base oil (A).

In the refrigerator oil composition according to an embodiment of the present invention, the base oil (A)

preferably comprises at least one base oil (hereinafter also referred to as "base oil (A1)") selected from the group consisting of a polyalkylene glycol (hereinafter also referred to as "PAG"), a polyvinyl ether (hereinafter also referred to as "PVE"), a copolymer of a poly(oxy)alkylene glycol or its monoether and a polyvinyl ether (hereinafter also referred to as "ECP"), a polyol ester (hereinafter also referred to as "POE"), and a mineral oil from the viewpoint of enhancing the thermal stability of the refrigerator oil composition, more preferably comprises at least one base oil (hereinafter also referred to as "base oil (A2)") selected from the group consisting of PAG and PVE from the viewpoint of enhancing the compatibility with a refrigerant, from the viewpoint of enhancing the hydrolysis resistance, and from the viewpoint of enhancing the thermal stability of the refrigerator oil composition. Even more preferably, the base oil (A) comprises PAG (hereinafter also referred to as "base oil (A3)") from the viewpoint of enhancing the wear resistance increasing effect.

The PAG, PVE, ECP, POE, and the mineral oil will be described in more detail below.

(Polyalkylene Glycol (PAG))

The PAG is preferably a polymer (A-1) represented by the following general formula (A-1):

(A-1)

When the base oil (A) comprises the PAG, either a single polymer or a combination of two or more polymers may be used as the PAG.

In the general formula (A-1), $R^{13a}$ represents a hydrogen atom, a monovalent hydrocarbon group having 1 to 10 carbon atoms, an acyl group having 2 to 10 carbon atoms, a divalent to hexavalent hydrocarbon group having 1 to 10 carbon atoms, or a substituted or unsubstituted heterocyclic group having 3 to 10 ring-forming atoms; $R^{14a}$ represents an alkylene group having 2 to 4 carbon atoms; and $R^{15a}$ represents a hydrogen atom, a monovalent hydrocarbon group having 1 to 10 carbon atoms, an acyl group having 2 to 10 carbon atoms, or a substituted or unsubstituted heterocyclic group having 3 to 10 ring-forming atoms.

Examples of substituents that the heterocyclic group may have include an alkyl group having 1 to 10 (preferably 1 to 6, more preferably 1 to 3) carbon atoms, a cycloalkyl group having 3 to 10 (preferably 3 to 8, more preferably 5 or 6) ring-forming carbon atoms, an aryl group having 6 to 18 (preferably 6 to 12) ring-forming carbon atoms, a halogen atom (a fluorine atom, a chlorine atom, a bromine atom, or an iodine atom), a cyano group, a nitro group, a hydroxy group, and an amino group.

These substituents may have any such substituent.

q is an integer of 1 to 6, preferably an integer of 1 to 3, and more preferably 1.

q is determined by the number of bonding sites in $R^{13a}$ in the general formula (A-1). For example, q is 1 when $R^{13a}$ is an alkyl group or an acyl group, and q is 2, 3, 4, 5, or 6 when $R^{13a}$ is a hydrocarbon group or a heterocyclic group, having a valence of 2, 3, 4, 5, or 6, respectively.

p represents the number of the $OR^{14a}$ repeating units, which is generally 1 or more, and preferably a number that makes the value "p×q" fall within the range of 6 to 80. The value of p is appropriately set so that the 40° C. kinematic viscosity of the base oil (A) falls within an appropriate range, and is not particularly limited as long as the 40° C. kinematic viscosity is controlled within the appropriate range.

The $R^{14a}$s may be the same or different. When q is 2 or more, the $R^{15a}$s in one molecule may be the same or different.

Examples of the monovalent hydrocarbon group represented by $R^{13a}$ and $R^{15a}$ include an alkyl group such as a methyl group, an ethyl group, a n-propyl group, an isopropyl group, various butyl groups, various pentyl groups, various hexyl groups, various heptyl groups, various octyl groups, various nonyl groups, and various decyl groups; a cycloalkyl group such as a cyclopentyl group, a cyclohexyl group, various methylcyclohexyl groups, various ethylcyclohexyl groups, various propylcyclohexyl groups, and various dimethylcyclohexyl groups; an aryl group such as a phenyl group, various methylphenyl groups, various ethylphenyl groups, various dimethylphenyl groups, various propylphenyl groups, various trimethylphenyl groups, various butylphenyl groups, and various naphthyl groups; and an arylalkyl group such as a benzyl group, various phenylethyl groups, various methylbenzyl groups, various phenylpropyl groups, and various phenylbutyl groups. The alkyl group may be either linear or branched.

The term "various" herein means a "linear, branched, or cyclic" hydrocarbon group; for example, the "various butyl groups" refer to butyl groups including "a n-butyl group, a sec-butyl group, an isobutyl group, a tert-butyl group, and a cyclobutyl group". A group having a cyclic structure herein includes positional isomers such as an ortho-isomer, a meta-isomer, and a para-isomer.

The number of carbon atoms of the monovalent hydrocarbon group represented by $R^{13a}$ and $R^{15a}$ is preferably 1 to 10, more preferably 1 to 6, and even more preferably 1 to 3 from the viewpoint of compatibility with a refrigerant.

The hydrocarbon group moiety of the acyl group having 2 to 10 carbon atoms represented by $R^{13a}$ and $R^{15a}$ may be either linear, branched, or cyclic. Examples of the alkyl group moiety include hydrocarbon groups represented by $R^{13a}$ and $R^{15a}$ and having 1 to 9 carbon atoms.

The number of carbon atoms of the acyl group represented by $R^{13a}$ and $R^{15a}$ is preferably 2 to 8, more preferably 2 to 6 from the viewpoint of compatibility with a refrigerant.

Examples of the divalent to hexavalent hydrocarbon group represented by $R^{13a}$ include a residue obtained by removing 1 to 5 hydrogen atoms from the monovalent hydrocarbon group represented by $R^{13a}$, and a residue obtained by removing hydroxy groups from a polyhydric alcohol such as trimethylolpropane, glycerin, pentaerythritol, sorbitol, 1,2,3-trihydroxycyclohexane, or 1,3,5-trihydroxycyclohexane.

The number of carbon atoms of the divalent to hexavalent acyl group represented by $R^{13a}$ is preferably 2 to 10, more preferably 2 to 6 from the viewpoint of compatibility with a refrigerant.

The heterocyclic group represented by $R^{13a}$ and $R^{15a}$ is preferably an oxygen atom-containing heterocyclic group or a sulfur atom-containing heterocyclic group. The heterocyclic group may be a saturated ring or an unsaturated ring.

The oxygen atom-containing heterocyclic group includes a residue obtained by removing 1 to 6 hydrogen atoms from an oxygen atom-containing saturated heterocyclic ring such as ethylene oxide, 1,3-propylene oxide, tetrahydrofuran, tetrahydropyran, or hexamethylene oxide, or from an oxygen atom-containing unsaturated heterocyclic ring such as acetylene oxide, furan, pyran, oxycycloheptatriene, isobenzofuran, or isochromene.

The sulfur atom-containing heterocyclic group includes a residue obtained by removing 1 to 6 hydrogen atoms from a sulfur atom-containing saturated heterocyclic ring such as ethylene sulfide, trimethylene sulfide, tetrahydrothiophene, tetrahydrothiopyran, or hexamethylene sulfide, or from a sulfur atom-containing unsaturated heterocyclic ring such as acetylene sulfide, thiophene, thiapyran, or thiotripyridene.

The heterocyclic group represented by $R^{13a}$ and $R^{15a}$ may have a substituent, and the substituent may be bonded to an oxygen atom in the general formula (A-1). Examples of the substituent have been described above; the substituent is preferably an alkyl group having 1 to 6 carbon atoms, more preferably an alkyl group having 1 to 3 carbon atoms.

The number of ring-forming atoms of the heterocyclic group is preferably 3 to 10, more preferably 3 to 6 from the viewpoint of compatibility with a refrigerant.

Examples of the alkylene group represented by $R^{14a}$ include an alkylene group having 2 carbon atoms, such as a dimethylene group (—CH$_2$CH$_2$—) or an ethylene group (—CH(CH$_3$)—); an alkylene group having 3 carbon atoms, such as a trimethylene group (—CH$_2$CH$_2$CH$_2$—), a propylene group (—CH(CH$_3$)CH$_2$—), a propylidene group (—CHCH$_2$CH$_3$—), or an isopropylidene group (—C(CH$_3$)$_2$—); and an alkylene group having 4 carbon atoms, such as a tetramethylene group (—CH$_2$CH$_2$CH$_2$CH$_2$—), a 1-methyltrimethylene group (—CH(CH$_3$)CH$_2$CH$_2$—), a 2-methyltrimethylene group (—CH$_2$CH(CH$_3$)CH$_2$—), or a butylene group (—C(CH$_3$)$_2$CH$_2$—). Among them, a propylene group (—CH(CH$_3$)CH$_2$—) is preferred as $R^{14a}$.

In the polymer (A-1) represented by the general formula (A-1), the content of the oxypropylene unit (—OCH(CH$_3$)CH$_2$—) is preferably 50% by mol or more, more preferably 65% by mol or more, and even more preferably 80% by mol or more based on the total amount (100% by mol) of the oxyalkylene (OR$^{14a}$) in the polymer (A-1).

Among polymers (A-1) represented by the general formula (A-1), at least one selected from the group consisting of a polyoxypropylene glycol dimethyl ether represented by the following general formula (A-1-i), a polyoxyethylene polyoxypropylene glycol dimethyl ether represented by the following general formula (A-1-ii), a polyoxypropylene glycol monobutyl ether represented by the following general formula (A-1-iii), a polyoxypropylene glycol monomethyl ether represented by the following general formula (A-1-iv), and a polyoxypropylene glycol diacetate is preferred.

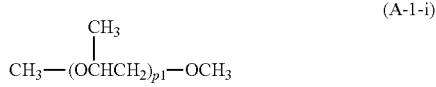

(A-1-i)

In the formula (A-1-i), p1 represents a number equal to or greater than 1, preferably a number of 6 to 80.

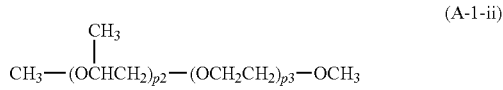

(A-1-ii)

In the formula (A-1-ii), p2 and p3 each independently represent a number equal to or greater than 1, preferably a number that makes the value "p2+p3" fall within the range of 6 to 80.

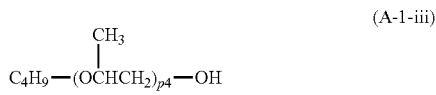

(A-1-iii)

In the formula (A-1-iii), p4 represents a number equal to or greater than 1, preferably a number of 6 to 80.

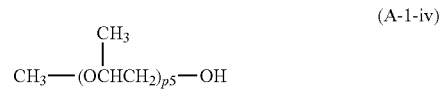

(A-1-iv)

In the formula (A-1-iv), p5 represents a number equal to or greater than 1, preferably a number of 6 to 80.

p1 in the general formula (A-1-i), p2 and p3 in the general formula (A-1-ii), p4 in the general formula (A-1-iii), and p5 in the general formula (A-1-iv) may be appropriately selected depending on the kinematic viscosity required for the base oil (A).

(Polyvinyl Ether (PVE))

Any polymer having at least one type of structural units derived from a vinyl ether may be used as the PVE.

When the base oil (A) comprises the PVE, either a single polymer or a combination of two or more polymers may be used as the PVE.

From the viewpoint of compatibility with a refrigerant, the PVE is preferably a polymer having at least one type of structural units derived from a vinyl ether and having a side chain alkyl group having 1 to 4 carbon atoms. The alkyl group is preferably a methyl group or an ethyl group, and more preferably a methyl group from the viewpoint of enhancing the compatibility with a refrigerant.

The PVE is preferably a polymer (A-2) having at least one type of structural units represented by the following general formula (A-2):

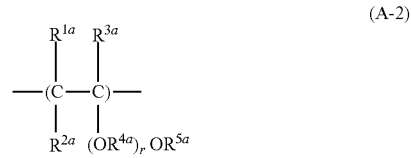

(A-2)

In the formula (A-2), $R^{1a}$, $R^{2a}$, and $R^{3a}$ each independently represent a hydrogen atom or a hydrocarbon group having 1 to 8 carbon atoms. $R^{4a}$ represents a divalent hydrocarbon group having 2 to 10 carbon atoms. $R^{5a}$ represents a hydrocarbon group having 1 to 10 carbon atoms. r represents the number of the OR$^{4a}$ repeating units and is generally 0 to 10, preferably 0 to 5, more preferably 0 to 3, and even more preferably 0. When a plurality of OR$^{4a}$s are present in each structural unit represented by the general formula (A-2), the OR$^{4a}$s may be the same or different.

Examples of the hydrocarbon group having 1 to 8 carbon atoms represented by $R^{1a}$, $R^{2a}$, and $R^{3a}$ include an alkyl group such as a methyl group, an ethyl group, a n-propyl group, an isopropyl group, various butyl groups, various pentyl groups, various hexyl groups, various heptyl groups, and various octyl groups; a cycloalkyl group such as a cyclopentyl group, a cyclohexyl group, various methylcyclohexyl groups, various ethylcyclohexyl groups, and various dimethylcyclohexyl groups; an aryl group such as a phenyl group, various methylphenyl groups, various ethylphenyl groups, and various dimethylphenyl groups; and an arylalkyl group such as a benzyl group, various phenylethyl groups, and various methylbenzyl groups.

The number of carbon atoms of the hydrocarbon group represented by $R^{1a}$, $R^{2a}$, and $R^{3a}$ is preferably 1 to 6, more preferably 1 to 3.

Preferably, $R^{1a}$, $R^{2a}$, and $R^{3a}$ are each independently a hydrogen atom or an alkyl group having 1 to 8 carbon atoms, more preferably a hydrogen atom or an alkyl group having 1 to 3 carbon atoms.

Examples of the divalent hydrocarbon group having 2 to 10 carbon atoms represented by $R^{4a}$ include a divalent aliphatic group such as an ethylene group, a 1,2-propylene group, a 1,3-propylene group, various butylene groups, various pentylene groups, various hexylene groups, various heptylene groups, various octylene groups, various nonylene groups, and various decylene groups; a divalent alicyclic group such as cyclohexane, methylcyclohexane, ethylcyclohexane, dimethylcyclohexane, and propylcyclohexane; a divalent aromatic group such as various phenylene groups, various methylphenylene groups, various ethylphenylene groups, various dimethylphenylene groups, and various naphthylene groups; a divalent alkyl aromatic group having a monovalent bonding site in each of the alkyl group moiety and the aromatic moiety of an alkyl aromatic hydrocarbon, such as toluene, xylene, and ethylbenzene; and a divalent alkyl aromatic group having bonding sites in the alkyl group moiety of a polyalkyl aromatic hydrocarbon, such as xylene and diethylbenzene.

The number of carbon atoms of the hydrocarbon group represented by Ra is preferably 2 to 6, more preferably 2 to 4.

$R^{4a}$ is preferably a divalent aliphatic group having 2 to 10 carbon atoms, more preferably a divalent aliphatic group having 2 to 4 carbon atoms.

Examples of the hydrocarbon group having 1 to 10 carbon atoms represented by $R^{5a}$ include an alkyl group such as a methyl group, an ethyl group, a n-propyl group, an isopropyl group, various butyl groups, various pentyl groups, various hexyl groups, various heptyl groups, various octyl groups, various nonyl groups, and various decyl groups; a cycloalkyl group such as a cyclopentyl group, a cyclohexyl group, various methylcyclohexyl groups, various ethylcyclohexyl groups, various propylcyclohexyl groups, and various dimethylcyclohexyl groups; an aryl group such as a phenyl group, various methylphenyl groups, various ethylphenyl groups, various dimethylphenyl groups, various propylphenyl groups, various trimethylphenyl groups, various butylphenyl groups, and various naphthyl groups; and an arylalkyl group such as a benzyl group, various phenylethyl groups, various methylbenzyl groups, various phenylpropyl groups, and various phenylbutyl groups.

The number of carbon atoms of the hydrocarbon group represented by $R^{5a}$ is preferably 1 to 8, more preferably 1 to 6.

$R^{5a}$ is preferably an alkyl group having 1 to 6 carbon atoms, more preferably an alkyl group having 1 to 4 carbon atoms, even more preferably a methyl group or an ethyl group, and still more preferably a methyl group from the viewpoint of enhancing the compatibility with a refrigerant.

The number (polymerization degree) of the structural units represented by the general formula (A-2) may be appropriately selected depending on the kinematic viscosity required for the base oil (A).

The polymer having the structural units represented by the general formula (A-2) may be either a homopolymer having only one type of the structural units or a copolymer having two or more types of the structural units. When the polymer is a copolymer, there is no particular limitation on the type of the copolymer; the copolymer may be either a block copolymer, a random copolymer, or a graft copolymer.

A monovalent group derived from a saturated hydrocarbon, an ether, an alcohol, a ketone, an amide, a nitrile, or the like may be introduced to an end of the polymer (A-2). Among them, a group represented by the following general formula (A-2-i) is preferably present at one end of the polymer (A-2).

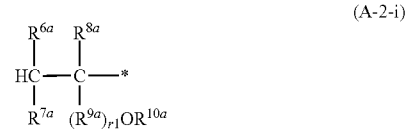

(A-2-i)

In the formula (A-2-i), the asterisk represents the position of bonding to a carbon atom in the structural unit represented by the general formula (A-2).

In the formula (A-2-i), $R^{6a}$, $R^{7a}$, and $R^{8a}$ each independently represent a hydrogen atom or a hydrocarbon group having 1 to 8 carbon atoms, preferably a hydrogen atom or a hydrocarbon group having 1 to 6 carbon atoms, and more preferably a hydrogen atom or an alkyl group having 1 to 3 carbon atoms. Examples of the hydrocarbon group having 1 to 8 carbon atoms represented by $R^{6a}$, $R^{7a}$, and $R^{8a}$ include those listed above with reference to the hydrocarbon group having 1 to 8 carbon atoms represented by $R^{1a}$, $R^{2a}$, and $R^{3a}$ in the general formula (A-2).

In the formula (A-2-i), $R^{9a}$ represents a divalent hydrocarbon group having 2 to 10 carbon atoms, preferably a divalent hydrocarbon group having 2 to 6 carbon atoms, and more preferably a divalent aliphatic group having 2 to 4 carbon atoms.

In the formula (A-2-i), r1 represents the number of the $OR^{9a}$ repeating units and is generally 0 to 10, preferably 0 to 5, more preferably 0 to 3, and even more preferably 0. When a plurality of $OR^{9a}$s are present in each structural unit represented by the general formula (A-2-i), the $OR^{9a}$s may be the same or different.

Examples of the divalent hydrocarbon group having 2 to 10 carbon atoms represented by $R^{9a}$ include those listed above with reference to the divalent hydrocarbon group having 2 to 10 carbon atoms represented by $R^{4a}$ in the general formula (A-2).

In the formula (A-2-i), $R^{10a}$ represents a hydrocarbon group having 1 to 10 carbon atoms, preferably a hydrocarbon group having 1 to 8 carbon atoms, and more preferably an alkyl group having 1 to 8 carbon atoms.

An alkyl group having 1 to 6 carbon atoms is preferred as $R^{10a}$ when r1 in the general formula (A-2-i) is 0, and an alkyl group having 1 to 4 carbon atoms is preferred as $R^{10a}$ when r1 is 1 or more.

Examples of the hydrocarbon group having 1 to 10 carbon atoms represented by $R^{10a}$ include those listed above with reference to the hydrocarbon group having 1 to 10 carbon atoms represented by $R^{5a}$ in the general formula (A-2).

When a group represented by the general formula (A-2-i) is present at one end of the polymer (A-2), one of a group represented by the general formula (A-2-i), a group represented by the following general formula (A-2-ii), a group represented by the following general formula (A-2-iii), and a group having an olefinic unsaturated bond is preferably present at the other end of the polymer (A-2).

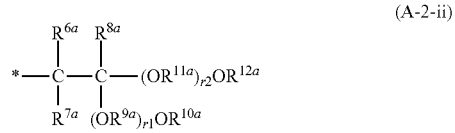

(A-2-ii)

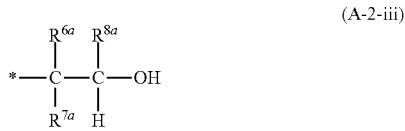

(A-2-iii)

In the general formulae (A-2-ii) and (A-2-iii), $R^{6a}$, $R^{7a}$, $R^{8a}$, $R^{9a}$, $R^{10a}$, and r1 have the same meanings as in the general formula (A-2-i). In the general formula (A-2-ii), $R^{11a}$, $R^{12a}$, and r2 have the same meanings as $R^{9a}$, $R^{10a}$, and r1, respectively, in the general formula (A-2-i).

(Copolymer (ECP) of Poly(oxy)alkylene Glycol or its Monoether and Polyvinyl Ether)

The copolymer (ECP) of a poly(oxy)alkylene glycol or its monoether and a polyvinyl ether may be any copolymer having structural units derived from a poly(oxy)alkylene glycol or its monoether and structural units derived from a polyvinyl ether.

The term "poly(oxy)alkylene glycol" refers to both polyalkylene glycol and polyoxyalkylene glycol.

When the base oil (A) comprises the ECP, either a single copolymer or a combination of two or more copolymers may be used as the ECP.

A copolymer (A-3-i) represented by the following general formula (A-3-i) or a copolymer (A-3-ii) represented by the following general formula (A-3-ii) is preferred as the ECP.

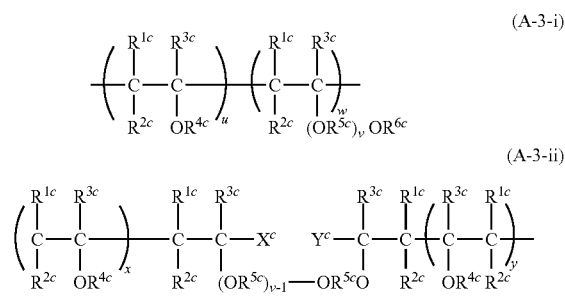

In the general formulae (A-3-i) and (A-3-ii), $R^{1c}$, $R^{2c}$, and $R^{3c}$ each independently represent a hydrogen atom or a hydrocarbon group having 1 or more and 8 or less carbon atoms.

$R^{4c}$s each independently represent a hydrocarbon group having 1 to 10 carbon atoms.

$R^{5c}$s each independently represent an alkylene group having 2 to 4 carbon atoms.

$R^{6c}$s each independently represent a hydrogen atom, an alkyl group having 1 to 20 carbon atoms, a substituted or unsubstituted alicyclic group having 3 to 20 ring-forming carbon atoms, a substituted or unsubstituted aromatic group having 6 to 24 ring-forming carbon atoms, an acyl group having 2 to 20 carbon atoms, or an oxygen-containing hydrocarbon group having 2 to 50 carbon atoms.

When a plurality of $R^{1c}$s, $R^{2c}$s, $R^{3c}$s, $R^{4c}$s, $R^{5c}$s, and $R^{6c}$s are present in each structural unit, they may be the same or different.

$X^c$ and $Y^c$ each independently represent a hydrogen atom, a hydroxy group, or a hydrocarbon group having 1 to 20 carbon atoms.

v in the general formulae (A-3-i) and (A-3-ii) represents a mean value of the number of units represented by $OR^{5c}$ and is a number equal to or greater than 1, preferably a number of 1 to 50. When a plurality of $OR^{5c}$s are present, the $OR^{5c}$s may be the same or different. "$OR^{5c}$" represents a structural unit derived from a poly(oxy)alkylene glycol or its monoether.

u in the general formula (A-3-i) is a number equal to or greater than 0, preferably a number of 0 to 50, and w is a number equal to or greater than 1, preferably a number of 1 to 50.

x and y in the general formula (A-3-ii) are each independently a number equal to or greater than 1, preferably a number of 1 to 50.

The values of v, u, w, x, and y are not particularly limited and may be adjusted according to a hydroxyl value required for the base oil (A).

There is no particular limitation on the type of the copolymer (A-3-i) and the type of the copolymer (A-3-ii); the copolymers may each be a block copolymer, a random copolymer, or a graft copolymer.

Examples of the hydrocarbon group having 1 to 8 carbon atoms, which can be selected for $R^{1c}$, $R^{2c}$, and $R^{3c}$, include the above-listed monovalent hydrocarbon groups having 1 to 8 carbon atoms which can be selected for $R^{1a}$, $R^{2a}$, and $R^{3a}$ in the general formula (A-1).

The number of carbon atoms of the hydrocarbon group which can be selected for $R^{1c}$, $R^{2c}$, and $R^{3c}$ is preferably 1 to 8, more preferably 1 to 6, and even more preferably 1 to 3.

Preferably, $R^{1c}$, $R^{2c}$, and $R^{3c}$ are each independently a hydrogen atom or an alkyl group having 1 to 8 carbon atoms, more preferably a hydrogen atom or an alkyl group having 1 to 6 carbon atoms, and even more preferably a hydrogen atom or an alkyl group having 1 to 3 carbon atoms.

Preferably, at least one of $R^{1c}$, $R^{2c}$, and $R^{3c}$ is a hydrogen atom, and more preferably, all of $R^{1c}$, $R^{2c}$, and $R^{3c}$ are hydrogen atoms.

Examples of the hydrocarbon group having 1 to 10 carbon atoms, which can be selected for $R^{4c}$, include the above-listed hydrocarbon groups having 1 to 10 carbon atoms which can be selected for $R^{5a}$ in the general formula (A-2).

The number of carbon atoms of the hydrocarbon group which can be selected for $R^{4c}$ is preferably 1 to 8, more preferably 1 to 6, and even more preferably 1 to 4.

Examples of the alkylene group, which can be selected for $R^{5c}$, include the above-listed alkylene groups having 2 or more and 4 or less carbon atoms which can be selected for $R^{14a}$ in the general formula (A-1). The alkylene group is preferably a propylene group ($—CH(CH_3)CH_2—$).

In the copolymer (A-3-i) or the copolymer (A-3-ii), the content of the oxypropylene unit ($—OCH(CH_3)CH_2—$) is preferably 50 mol % or more and 100 mol % or less, more preferably 65 mol % or more and 100 mol % or less, and even more preferably 80 mol % or more and 100 mol % or less based on the overall amount (100 mol %) of the oxyalkylene ($OR^{5c}$) which is a structural unit derived from the poly(oxy)alkylene glycol or its monoether in the copolymer (A-3-i) or the copolymer (A-3-ii).

Examples of the alkyl group having 1 to 20 carbon atoms, which can be selected for $R^{6c}$, include a methyl group, an ethyl group, various propyl groups, various butyl groups, various pentyl groups, various hexyl groups, various heptyl groups, various octyl groups, various nonyl groups, and various decyl groups.

The number of carbon atoms of the alkyl group is preferably 1 to 10, more preferably 1 to 6, and even more preferably 1 to 3.

Examples of the alicyclic group having 3 to 20 ring-forming carbon atoms, which can be selected for $R^{6c}$, include a cyclopropyl group, a cyclobutyl group, a cyclopentyl group, a cyclohexyl group, a cycloheptyl group, a cyclooctyl group, a cyclononyl group, and a cyclodecyl group.

The number of ring-forming carbon atoms of the alicyclic group is preferably 3 to 10, more preferably 3 to 8, and even more preferably 3 to 6. The alicyclic group may have any of the substituents described above, preferably an alkyl group.

Examples of the aromatic group having 6 to 24 ring-forming carbon atoms, which can be selected for $R^{6c}$, include a phenyl group, a naphthyl group, an anthracenyl group, and a phenanthryl group.

The number of ring-forming carbon atoms of the aromatic group is preferably 6 to 18, more preferably 6 to 12.

The aromatic group may have any of the substituents described above, preferably an alkyl group.

Examples of the acyl group having 2 to 20 ring-forming carbon atoms, which can be selected for $R^{6c}$, include an acetyl group, a propionyl group, a butyryl group, an isobutyryl group, a valeryl group, an isovaleryl group, a pivaloyl group, a benzoyl group, and a toluoyl group.

The number of carbon atoms of the acyl group is preferably 2 to 10, more preferably 2 to 8, and even more preferably 2 to 6.

Examples of the oxygen-containing hydrocarbon group having 2 to 50 carbon atoms, which can be selected for $R^{6c}$, include a methoxymethyl group, a methoxyethyl group, a methoxypropyl group, a 1,1-bismethoxypropyl group, a 1,2-bismethoxypropyl group, an ethoxypropyl group, a (2-methoxyethoxy) propyl group, and a (1-methyl-2-methoxy) propyl group.

The number of carbon atoms of the oxygen-containing hydrocarbon group is preferably 2 to 20, more preferably 2 to 10, and even more preferably 2 to 6.

The hydrocarbon group having 1 to 20 carbon atoms, which can be selected for $X^c$ and $Y^c$, includes an alkyl group having 1 to 20 (preferably 1 to 10, more preferably 1 to 6, and even more preferably 1 to 3) carbon atoms, a substituted or unsubstituted cycloalkyl group having 3 to 20 (preferably 3 to 10, more preferably 3 to 8, and even more preferably 3 to 6) ring-forming carbon atoms, a substituted or unsubstituted phenyl group, a substituted or unsubstituted naphthyl group, and an arylalkyl group having 7 to 20 (preferably 7 to 13) carbon atoms.

(Polyol Ester (POE))

The POE may be, for example, an ester of a hindered alcohol and a fatty acid. When the base oil (A) comprises the POE, either a single compound or a combination of two or more compounds may be used as the POE.

The POE is preferably an ester of a hindered alcohol (e.g., a diol or a polyol having 3 to 20 hydroxy groups) and a fatty acid having 3 to 20 carbon atoms.

A diol such as neopentyl glycol, or a polyol such as trimethylolethane, trimethylolpropane, trimethylolbutane, di-(trimethylolpropane), tri (trimethylolpropane), pentaerythritol, di-(pentaerythritol), or tri-(pentaerythritol) is preferred as the hindered alcohol. The hindered alcohol means an alcohol having a quaternary carbon atom bonded to four carbon atoms.

The number of carbon atoms of the fatty acid is preferably 3 or more, more preferably 4 or more, even more preferably 5 or more, and still more preferably 8 or more from the viewpoint of lubricating performance, while it is preferably 20 or less, more preferably 16 or less, even more preferably 12 or less, and sill more preferably 10 or less from the viewpoint of compatibility with a refrigerant.

The above-described number of carbon atoms of the fatty acid includes the carbon atom of the carboxy group (—COOH) of the fatty acid.

Though the fatty acid may be either a linear fatty acid or a branched fatty acid, a linear fatty acid is preferred from the viewpoint of lubricating performance, while a branched fatty acid is preferred from the viewpoint of hydrolysis stability. The fatty acid may be either a saturated fatty acid or an unsaturated fatty acid.

Examples of the fatty acid include linear or branched fatty acids, such as isobutyric acid, propionic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid, as well as so-called neo acids in which the a carbon atom is quaternized.

Specific examples of preferable fatty acids include isobutyric acid, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, and 3,5,5-trimethylhexanoic acid.

The POE may be either a partial ester in which the hydroxy groups of a polyol partly remain non-esterified or a complete ester in which all the hydroxy groups are esterified. The POE may also be a mixture of a partial ester and a complete ester. The POE is preferably a complete ester.

The POE is preferably an ester of neopentyl glycol, trimethylolethane, trimethylolpropane, trimethylolbutane, or pentaerythritol, and from the viewpoint of especially excellent compatibility with a refrigerant and hydrolysis stability, it is more preferably an ester of pentaerythritol.

Specific examples of preferable POEs include a diester of neopentyl glycol with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; of a triester trimethylolethane with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol with at least one fatty acid selected from the group consisting of isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

An ester of a polyol and two or more fatty acids may be a mixture of two or more esters of a fatty acid and a polyol. An ester of a polyol and two or more fatty acids is preferred as the POE from the viewpoint of enhancing low-temperature properties and from the viewpoint of compatibility with a refrigerant.

(Mineral Oil)

Examples of the mineral oil include a refined oil produced by subjecting a lubricating oil distillate, obtained by atmospheric distillation of a paraffin-based crude oil, an intermediated crude oil or a naphthene-based crude oil, or by reduced-pressure distillation of an atmospheric residue obtained by atmospheric distillation of a crude oil, to at least one of solvent deasphalting, solvent extraction, hydrocracking, solvent dewaxing, catalytic dewaxing, hydrorefining, etc.; and an oil produced by isomerization of a mineral oil-based wax.

When the base oil (A) comprises the mineral oil, either a single oil or a combination of two or more oils may be used as the mineral oil.

(Preferred Embodiment of Base Oil (A))

In the refrigerator oil composition according to an embodiment of the present invention, the main component of the base oil (A) is preferably the base oil (A1), more preferably the base oil (A2), and even more preferably the base oil (A3). As used herein, the term "main component" refers to a component having the highest content.

The content of the base oil (A1), the base oil (A2), or the base oil (A3) in the base oil (A) is preferably 50 to 100% by mass, more preferably 60 to 100% by mass, even more preferably 70 to 100% by mass, still more preferably 80 to 100% by mass, yet more preferably 90 to 100% by mass, and yet more preferably 100% by mass based on the total amount (100% by mass) of the base oil (A).

The base oil (A1) may be the PAG, PVE, ECP, POE, or the mineral oil.

The base oil (A2) may be the PAG or PVE.

(Other Base Oil)

The base oil (A) may further contain other base oil(s) as long as the effect of the present invention is not impaired.

Examples of such other base oils include synthetic oils that do not correspond to the PVE, PAG, ECP and POE described above, such as a polyester, a polycarbonate, a hydrogenated product of an α-olefin oligomer, an alicyclic hydrocarbon compound, an alkylated aromatic hydrocarbon compound, and an oil obtained by isomerization of a GTL (gas-to-liquid) wax produced, e.g., by the Fischer-Tropsch process.

(40° C. Kinematic Viscosity of Base Oil (A))

The 40° C. kinematic viscosity of the base oil (A) is preferably 5 to 120 mm²/s, more preferably 10 to 110 mm²/s, and even more preferably 30 to 100 mm²/s. When the 40° C. kinematic viscosity of the base oil (A) is within the above range, a better wear resistance of an iron sliding portion can be ensured.

The 40° C. kinematic viscosity is herein measured according to JIS K 2283:2000.

<Phosphorus-Based Extreme Pressure Agent (B)>

The refrigerator oil composition of the present invention contains the phosphorus-based extreme pressure agent (B). If the refrigerator oil composition does not contain the phosphorus-based extreme pressure agent (B), the composition cannot ensure excellent wear resistance.

A phosphorus-based extreme pressure agent, commonly used in a refrigerator oil composition, can be used as the phosphorus-based extreme pressure agent (B) without any particular limitation. For example, it is possible to use at least one selected from the group consisting of a phosphate ester, an acid phosphate ester, a phosphite ester, a hydrogenphosphite ester (these compounds will be hereinafter also referred to as a "phosphate ester compound"), and an amine salt of a phosphate ester compound.

More specifically, a phosphate ester represented by the following general formula (B-1), an acid phosphate ester represented by the following general formula (B-2), a phosphite ester represented by the following general formula (B-3), and a hydrogenphosphite ester represented by the following general formula (B-4) or (B-5) are preferably used as a phosphate ester, an acid phosphate ester, a phosphite ester, and a hydrogenphosphite ester.

(B-1)

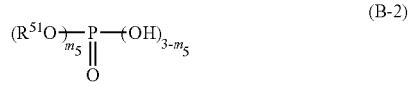

(B-2)

(B-3)

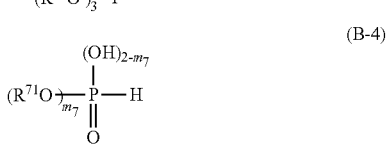

(B-4)

(B-5)

In the general formulae (B-1) to (B-5), $R^{41}$, $R^{51}$, $R^{61}$, $R^{71}$ and $R^{81}$ each independently represent a hydrocarbon group having 1 to 30 carbon atoms. The hydrocarbon group is preferably an alkyl group, an alkenyl group, an aryl group or an arylalkyl group from the viewpoint of ensuring superior wear resistance, and more preferably an alkyl group in view of availability.

When $R^{41}$, $R^{51}$, $R^{61}$, $R^{71}$ and $R^{81}$ are each an alkyl group, the number of carbon atoms is preferably 2 or more, more preferably 4 or more, and even more preferably 10 or more from the viewpoint of ensuring superior wear resistance and in view of availability, while it is preferably 30 or less, more preferably 24 or less, and even more preferably 20 or less. The alkyl group may be either linear, branched or cyclic; however, it is preferably linear or branched in view of availability, etc.

When $R^{41}$, $R^{51}$, $R^{61}$, $R^{71}$ and $R^{81}$ are each an alkenyl group, the number of carbon atoms is preferably 2 or more, more preferably 4 or more, and even more preferably 10 or more from the viewpoint of ensuring superior wear resistance and in view of availability, while it is preferably 30 or less, more preferably 24 or less, and even more preferably 20 or less. The alkenyl group may be either linear, branched or cyclic; however, it is preferably linear or branched.

When $R^{41}$, $R^{51}$, $R^{61}$, $R^{71}$ and $R^{81}$ are each an aryl group, the number of carbon atoms is preferably 6 or more from the viewpoint of ensuring superior wear resistance and in view of availability, while it is preferably 30 or less, more preferably 24 or less, and even more preferably 20 or less.

When $R^{41}$, $R^{51}$, $R^{61}$, $R^{71}$ and $R^{81}$ are each an arylalkyl group, the number of carbon atoms is preferably 7 or more, more preferably 10 or more from the viewpoint of ensuring superior wear resistance and in view of availability, while it is preferably 30 or less, more preferably 24 or less, and even more preferably 20 or less.

The $R^{41}$s, the $R^{61}$s, and the $R^{81}$s may be the same or different. When a plurality of $R^{51}$s and $R^{71}$s are present, they may be the same or different.

In the general formula (B-2), $m_5$ represents 1 or 2. In the general formula (B-4), $m_7$ represents 1 or 2.

Examples of the phosphate ester represented by the general formula (B-1) include triphenyl phosphate, tricresyl phosphate, benzyldiphenyl phosphate, ethyldiphenyl phosphate, tributyl phosphate, ethyldibutyl phosphate, cresyldiphenyl phosphate, dicresylphenyl phosphate, ethylphenyldiphenyl phosphate, diethylphenylphenyl phosphate, triethylphenyl phosphate, trihexyl phosphate, tri (2-ethylhexyl) phosphate, tridecyl phosphate, trilauryl phosphate, trimyristyl phosphate, tripalmityl phosphate, tristearyl phosphate, and trioleyl phosphate. Among them, tricresyl phosphate is preferred.

Examples of the acid phosphate ester represented by the general formula (B-2) include monoethyl acid phosphate, mono-n-propyl acid phosphate, mono-2-ethylhexyl acid phosphate, monobutyl acid phosphate, monooleyl acid phosphate, monoisodecyl acid phosphate, monolauryl acid phosphate, monostearyl acid phosphate, monoisostearyl acid phosphate, diethyl acid phosphate, di-n-propyl acid phosphate, di-2-ethylhexyl acid phosphate, dibutyl acid phosphate, dioleyl acid phosphate, diisodecyl acid phosphate, dilauryl acid phosphate, distearyl acid phosphate, and diisostearyl acid phosphate.

Examples of the phosphite ester represented by the general formula (B-3) include triethyl phosphite, tributyl phosphite, triphenyl phosphite, tricresyl phosphite, tri (nonylphenyl) phosphite, tri (2-ethylhexyl) phosphite, tridecyl phosphite, trilauryl phosphite, triisooctyl phosphite, diphenylisodecyl phosphite, tristearyl phosphite, and trioleyl phosphite.

Examples of hydrogenphosphite ester represented by the general formula (B-4) or (B-5) include monoethylhydrogen phosphite, mono-n-propylhydrogen phosphite, mono-n-butylhydrogen phosphite, mono-2-ethylhexylhydrogen phosphite, monolaurylhydrogen phosphite, monooleylhydrogen phosphite, monostearylhydrogen phosphite, monophenylhydrogen phosphite, diethylhydrogen phosphite, di-n-propylhydrogen phosphite, di-n-butylhydrogen phosphite, di-2-ethylhexylhydrogen phosphite, dilaurylhydrogen phosphite, dioleylhydrogen phosphite, distearylhydrogen phosphite, and diphenylhydrogen phosphite.

An amine salt formed from a phosphate ester compound and an amine is preferred as the amine salt of a phosphate ester compound. The amine for use in the formation of the amine salt includes a primary amine, a secondary amine, a tertiary amine, and a polyalkyleneamine. The primary amine, the secondary amine and the tertiary amine include amines represented by the following general formula (B-6).

$$R^{91}{}_{m_9}-NH_{3-m_9} \quad (B-6)$$

In the general formula (B-6), $R^{91}$ represents a hydrocarbon group having 1 to 30 carbon atoms, and specifically includes those described above with reference to $R^{41}$, $R^{51}$, $R^{61}$, $R^{71}$ and $R^{81}$. $R^{91}$ also includes hydroxyalkyl groups corresponding to the alkyl groups described above with reference to $R^{41}$, $R^{51}$, $R^{61}$, $R^{71}$ and $R^{81}$ in which at least one hydrogen atom has been replaced with a hydroxy group.

$m_9$ is 1, 2 or 3. When my is 1, the amine is a primary amine; when $m_9$ is 2, the amine is a secondary amine; and when mg is 3, the amine is a tertiary amine.

Examples of the polyalkyleneamine include ethylenediamine, tetraethylenepentamine, diethylenetriamine, triethylenetetramine, pentaethylenehexamine, hexaethyleneheptamine, tetrapropylenepentamine, and hexabutyleneheptamine, heptaethyleneoctamine.

Among them, a phosphate ester is preferred, a phosphate ester represented by the general formula (B-1) is more preferred, and tricresyl phosphate is even more preferred from the viewpoint of ensuring superior wear resistance.

(Content of Phosphorus-Based Extreme Pressure Agent (B))

The content of the phosphorus-based extreme pressure agent (B) is preferably 0.1% by mass or more, more preferably 0.3% by mass or more, and even more preferably 0.5% by mass or more based on the total amount of the refrigerator oil composition from the viewpoint of ensuring superior wear resistance, while it is preferably 1.5% by mass or less, more preferably 1.2% by mass or less.

The upper limit values and the lower limit values of these numerical ranges can be combined arbitrarily. In particular, the content of the phosphorus-based extreme pressure agent (B) is preferably 0.1% by mass to 1.5% by mass, more preferably 0.3% by mass to 1.5% by mass, and even more preferably 0.5% by mass to 1.2% by mass.

The content of phosphorus atoms derived from the phosphorus-based extreme pressure agent (B) is preferably 0.008% by mass or more, more preferably 0.025% by mass or more, and even more preferably 0.042% by mass or more based on the total amount of the refrigerator oil composition from the viewpoint of ensuring superior wear resistance, while it is preferably 0.13% by mass or less, more preferably 0.10% by mass or less.

The upper limit values and the lower limit values of these numerical ranges can be combined arbitrarily. In particular, the content of phosphorus atoms is preferably 0.008% by mass to 0.13% by mass, more preferably 0.025% by mass to 0.13% by mass, and even more preferably 0.042% by mass to 0.10% by mass.

The content of phosphorus atoms can be measured according to ASTM D4951.

When the refrigerator oil composition does not contain any phosphorus-based compound other than the phosphorus-based extreme pressure agent (B), the phosphorus atom content of the refrigerator oil composition is preferably within the above range.

<Decomposition Inhibitor (C)>

The refrigerator oil composition of the present invention contains the decomposition inhibitor (C) which inhibits the decomposition of an unsaturated fluorinated hydrocarbon compound in the presence of iron. If the refrigerator oil composition does not contain the decomposition inhibitor (C), the composition cannot ensure excellent wear resistance.

A refrigerator oil composition frequently uses the phosphorus-based extreme pressure agent (B) from the viewpoint of ensuring good wear resistance of a sliding portion. The phosphorus-based extreme pressure agent (B) generally produces a phosphorus coating on the surface of a sliding portion, thereby imparting wear resistance to the sliding surface. However, in the case of a sliding portion made of iron, the use of a refrigerant comprising an unsaturated fluorinated hydrocarbon compound (HFO) causes a reaction between iron and fluorine, derived from the unsaturated fluorinated hydrocarbon compound (HFO), to proceeds preferentially, resulting in corrosion wear of the sliding portion. According to the present invention, the use of the decomposition inhibitor (C), which inhibits the decomposition of an unsaturated fluorinated hydrocarbon compound in the presence of iron, in the refrigerator oil composition inhibits a reaction between fluorine and iron, thereby ensuring excellent wear resistance of an iron sliding portion.

The decomposition inhibitor (C) for use in the present invention is a compound which controls the amount of fluorine in the refrigerator oil composition at 30 ppm by mass or less after mixing the refrigerator oil composition and R1234yf at a mass ratio of 1:1, and subjecting the mixture to an autoclave test at 175° C. for 336 hours in the presence of a metal catalyst consisting of iron, copper, and aluminum.

In particular, the autoclave test is performed by the method described in Examples below.

If the amount of fluorine in the refrigerator oil composition after the autoclave test exceeds 30 ppm by mass, the refrigerator oil composition cannot ensure excellent wear resistance. In other words, the refrigerator oil composition cannot ensure excellent wear resistance unless the amount of fluorine in the refrigerator oil composition after the autoclave test is 30 ppm by mass or less.

The amount of fluorine in the refrigerator oil composition after the autoclave test is preferably 25 ppm by mass or less, more preferably 20 ppm by mass or less, even more preferably 15 ppm by mass or less, and still more preferably 10 ppm by mass or less from the viewpoint of ensuring superior wear resistance.

A compound which can inhibit the decomposition of an unsaturated fluorinated hydrocarbon compound (HFO) in the presence of iron, can control the amount of fluorine in the refrigerator oil composition after the autoclave test at the particular value or less and can be dissolved or dispersed in the refrigerator oil composition, can be used without any particular limitation as the decomposition inhibitor (C).

The decomposition inhibitor (C) for use in the refrigerator oil composition according to an embodiment of the present invention is preferably at least one selected from the group consisting of an organic metal salt (C1), an inorganic metal salt (C2), a nitrogen containing organic compound (C3), and a fatty acid ester (C4), more preferably at least one selected from the group consisting of an organic metal salt (C1), an inorganic metal salt (C2), and a nitrogen-containing organic compound (C3), even more preferably at least one selected from the group consisting of an organic metal salt (C1) and an inorganic metal salt (C2), and still more preferably an organic metal salt (C1).

Either a single compound or a combination of two or more compounds may be used as the organic metal salt (C1), the inorganic metal salt (C2), the nitrogen-containing organic compound (C3), or the fatty acid ester (C4).

The organic metal salt (C1), the inorganic metal salt (C2), the nitrogen-containing organic compound (C3), and the fatty acid ester (C4) will now be described in detail.

(Organic Metal Salt (C1))

An organic metal salt which can inhibit the decomposition of an unsaturated fluorinated hydrocarbon compound (HFO) in the presence of iron, can control the amount of fluorine in the refrigerator oil composition after the autoclave test at the particular value or less and can be dissolved or dispersed in the refrigerator oil composition, can be used without any particular limitation as the organic metal salt (C1). The organic metal salt (C1) is exemplified by a metal salicylate and a metal phenate.

The metal atom contained in the organic metal salt (C1) is preferably at least one alkali metal selected from sodium, potassium, etc., or at least one alkaline earth metal selected from magnesium, calcium, barium, etc., more preferably at least one alkaline earth metal selected from magnesium, calcium, barium, etc., and even more preferably calcium.

A metal salicylate is preferred as the organic metal salt (C1) from the viewpoint of controlling the amount of fluorine in the refrigerator oil composition after the autoclave test at the particular value or less, thereby enhancing the effect of the present invention. A compound represented by the following general formula (C1-1) is preferred as the metal salicylate.

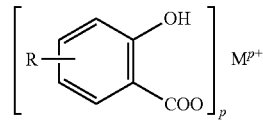

(C1-1)

In the general formula (C1-1), M is a metal atom selected from an alkali metal and an alkaline earth metal. p represents the valence of M, and is 1 or 2. R is a hydrogen atom or a hydrocarbon group having 1 to 18 carbon atoms.

The hydrocarbon group, which can be selected for R, includes an alkyl group having 1 to 18 carbon atoms, an alkenyl group having 1 to 18 carbon atoms, a cycloalkyl group having 3 to 18 ring-forming carbon atoms, an aryl group having 6 to 18 ring-forming carbon atoms, an alkylaryl group having 7 to 18 carbon atoms, and an arylalkyl group having 7 to 18 carbon atoms.

The metal salicylate may be either neutral, basic or perbasic; however, it is preferably basic or perbasic, more preferably perbasic from the viewpoint of ensuring excellent wear resistance.

A metal salicylate is herein defined as "neutral" when its base number, as measured by the below-described method, is less than 50 mgKOH/g, "basic" when its base number is 50 mgKOH/g or more and less than 150 mgKOH/g, and "perbasic" when its base number is 150 mgKOH/g or more.

The base number of the metal salicylate is preferably 150 mgKOH/g or more, more preferably 200 mgKOH/g or more, even more preferably 250 mgKOH/g or more, and still more preferably 300 mgKOH/g or more, while it is preferably 500 mgKOH/g or less, more preferably 450 mgKOH/g or less, and even preferably 400 mgKOH/g or less.

The upper limit values and the lower limit values of these numerical ranges can be combined arbitrarily. In particular, the base number of the metal salicylate is preferably 150 mgKOH/g to 500 mgKOH/g, more preferably 200 mgKOH/g to 450 mgKOH/g, even more preferably 250 mgKOH/g to 400 mgKOH/g, and still more preferably 300 mgKOH/g to 400 mgKOH/g. The base number is herein measured by the potentiometric titration method (base number/perchloric acid method) according to JIS K 2501:2003 (9).

In one embodiment of the present invention, the metal salicylate is preferably an alkaline earth metal salicylate, more preferably calcium salicylate from the viewpoint of enhancing the effect of the present invention. The base number of calcium salicylate is preferably 150 mgKOH/g or more, more preferably 200 mgKOH/g or more, even more preferably 250 mgKOH/g or more, and still more preferably 300 mgKOH/g or more, while it is preferably 500 mgKOH/g or less, more preferably 450 mgKOH/g or less, and even more preferably 400 mgKOH/g or less.

The upper limit values and the lower limit values of these numerical ranges can be combined arbitrarily. In particular, the base number of calcium salicylate is preferably 150 mgKOH/g to 500 mgKOH/g, more preferably 200 mgKOH/g to 450 mgKOH/g, even more preferably 250 mgKOH/g to 400 mgKOH/g, and still more preferably 300 mgKOH/g to 400 mgKOH/g.

Either a single compound or a combination of two or more compounds may be used as the organic metal salt (C1).

(Inorganic Metal Salt (C2))

An inorganic metal salt which can inhibit the decomposition of an unsaturated fluorinated hydrocarbon compound (HFO) in the presence of iron, can control the amount of fluorine in the refrigerator oil composition after the autoclave test at the particular value or less and can be dissolved or dispersed in the refrigerator oil composition, can be used without any particular limitation as the inorganic metal salt (C2). The inorganic metal salt (C2) is exemplified by a borate, a vanadate, a silicate, an aluminate, and a tungstate. Among them, a borate is preferred. The metal atom contained in the inorganic metal salt (C2) is preferably an alkali metal such as sodium or potassium, or an alkaline earth metal such as magnesium, calcium, or barium, more preferably an alkali metal such as sodium or potassium, and even more preferably sodium.

Sodium borate, potassium borate, sodium vanadate, potassium vanadate, sodium silicate, sodium aluminate, and sodium tungstate are preferred for use as the inorganic metal salt (C2), sodium borate and potassium borate are more preferred, and sodium borate is even more preferred from the viewpoint of controlling the amount of fluorine in the refrigerator oil composition after the autoclave test at the particular value or less, thereby enhancing the effect of the present invention.

Either a single compound or a combination of two or more compounds may be used as the inorganic metal salt (C2).

(Nitrogen-Containing Organic Compound (C3))

A nitrogen-containing organic compound which can inhibit the decomposition of an unsaturated fluorinated hydrocarbon compound (HFO) in the presence of iron, can control the amount of fluorine in the refrigerator oil composition after the autoclave test at the particular value or less and can be dissolved or dispersed in the refrigerator oil composition, can be used without any particular limitation as the nitrogen-containing organic compound (C3). The nitrogen-containing organic compound (C3) is exemplified by a compound having a pyridine skeleton, a compound having a piperidine skeleton, a compound having a piperazine skeleton, and a compound having a diazine skeleton. Among them, a compound having a pyridine skeleton is preferred.

The nitrogen-containing organic compound preferably has at least one hydroxy group. Thus, the compound having a pyridine skeleton, the compound having a piperidine skeleton, the compound having a piperazine skeleton, and the compound having a diazine skeleton each preferably have at least one hydroxy group.

A compound having a pyridine skeleton and at least one hydroxy group is preferred, a compound having a quinoline skeleton and at least one hydroxy group is more preferred, and 8-quinolinol is even more preferred as the nitrogen-containing organic compound (C3) from the viewpoint of controlling the amount of fluorine in the refrigerator oil composition after the autoclave test at the particular value or less, thereby enhancing the effect of the present invention.

(Sorbitan Fatty Acid Ester (C4))

A sorbitan fatty acid ester (C4) is an ester compound of sorbitan and a fatty acid. While the sorbitan fatty acid ester (C4) may be either a partial ester or a complete ester, it is preferably a partial ester from the viewpoint of enhancing the effect of the present invention. Thus, the sorbitan fatty acid ester (C4) preferably comprises at least one selected from the group consisting of a sorbitan fatty acid monoester, a sorbitan fatty acid diester, and a sorbitan fatty acid triester.

The number of carbon atoms of the fatty acid, constituting the sorbitan fatty acid ester (C4), is preferably 14 or more, more preferably 16 or more, while it is preferably 22 or less, more preferably 20 or less. Thus, an exemplary fatty acid preferably has 14 to 22 carbon atoms, more preferably 16 to 20 carbon atoms. The number of carbon atoms of the fatty acid includes the carbon atom of the carboxy group (—COOH) of the fatty acid. While the fatty acid may be either linear or branched, it is preferably linear.

Examples of the fatty acid include linear saturated fatty acids such as palmitic acid and stearic acid, and linear unsaturated fatty acids such as oleic acid and elaidic acid. These acids may be used singly or in a combination of two or more. Among them, a linear unsaturated fatty acid is preferably used, and oleic acid is more preferably used from the viewpoint of enhancing the effect of the present invention. Thus, the sorbitan fatty acid ester (C4) more preferably comprises at least one selected from the group consisting of sorbitan monooleate, sorbitan dioleate, and sorbitan trioleate.

<Content of Decomposition Inhibitor (C)>

The content of the decomposition inhibitor (C) is preferably 0.001% by mass or more, more preferably 0.002% by mass or more, even more preferably 0.004% by mass or more, still more preferably 0.006% by mass or more, yet more preferably 0.008% by mass or more, and yet more preferably 0.01% by mass or more based on the total amount of the refrigerator oil composition from the viewpoint of ensuring superior wear resistance, while it is preferably 1.0% by mass or less, more preferably 0.50% by mass or less, even more preferably 0.30% by mass or less, still more preferably 0.2% by mass or less, and yet more preferably 0.15% by mass or less.

The upper limit values and the lower limit values of these numerical ranges can be combined arbitrarily. In particular, the content of the decomposition inhibitor (C) is preferably 0.001% by mass to 1.0% by mass, more preferably 0.002% by mass to 0.50% by mass, even more preferably 0.004% by mass to 0.30% by mass, still more preferably 0.006% by mass to 0.2% by mass, yet more preferably 0.008% by mass to 0.15% by mass, and yet more preferably 0.01% by mass to 0.15% by mass.

When the decomposition inhibitor (C) comprises at least one of the organic metal salt (C1) and the inorganic metal salt (C2), the content of metal atoms derived from the decomposition inhibitor (C) is preferably 1 ppm by mass or more, more preferably 2 ppm by mass or more, even more preferably 5 ppm by mass or more, still more preferably 7 ppm by mass or more, and yet more preferably 10 ppm by mass or more based on the total amount of the refrigerator oil composition, while it is preferably 1,250 ppm by mass or less, more preferably 625 ppm by mass or less, even more preferably 375 ppm by mass or less, still more preferably 250 ppm by mass or less, and yet more preferably 180 ppm by mass or less.

The upper limit values and the lower limit values of these numerical ranges can be combined arbitrarily. In particular, the content of metal atoms is preferably 1 ppm by mass to 1,250 ppm by mass, more preferably 2 ppm by mass to 625 ppm by mass, even more preferably 5 ppm by mass to 375 ppm by mass, still more preferably 7 ppm by mass to 250 ppm by mass, and yet more preferably 10 ppm by mass to 180 ppm by mass.

The content of metal atoms can be measured according to ASTM D4951.

When the refrigerator oil composition does not contain any metal compound other than the decomposition inhibitor (C), the content of metal atoms in the refrigerator oil composition is preferably within the above range.

<Content Ratio of Phosphorus-Based Extreme Pressure Agent (B) to Decomposition Inhibitor (C)>

The content ratio of the phosphorus-based extreme pressure agent (B) to the decomposition inhibitor (C) [(B)/(C)], expressed in mass ratio, is preferably 2 or more, more preferably 3 or more, even more preferably 4 or more, and still more preferably 5 or more from the viewpoint of ensuring superior wear resistance, while it is preferably 200 or less, more preferably 180 or less, even more preferably 150 or less, still more preferably 120 or less, and yet more preferably 110 or less.

The upper limit values and the lower limit values of these numerical ranges can be combined arbitrarily. In particular, the content ratio is preferably 2 to 200, more preferably 2 to 180, even more preferably 3 to 150, still more preferably 4 to 120, and yet more preferably 5 to 110.

<Antioxidant (D)>

The refrigerator oil composition of the present invention contains the antioxidant (D). If the refrigerator oil composition does not contain the antioxidant (D), the oxidation stability of the composition will be insufficient.

The antioxidant (D) is preferably at least one selected from the group consisting of a phenolic antioxidant and an amine antioxidant.

Examples of the phenolic antioxidant include 2,6-di-tert-butyl-p-cresol (DBPC), 2,6-di-tert-butyl-4-ethylphenol, and 2,2'-methylenebis(4-methyl-6-tert-butylphenol).

Examples of the amine antioxidant include phenyl-α-naphthylamine and N,N'-diphenyl-p-phenylenediamine.

Among them, a phenolic antioxidant is preferred, and 2,6-di-tert-butyl-p-cresol (DBPC) is particularly preferred.

The content of the antioxidant (D) is preferably 0.01% by mass or more, more preferably 0.05% by mass or more, and even more preferably 0.1% by mass or more based on the total amount (100% by mass) of the refrigerator oil composition from the viewpoint of stability and antioxidant performance, while it is preferably 5% by mass or less, more preferably 3% by mass or less, and even more preferably 1% by mass or less.

The upper limit values and the lower limit values of these numerical ranges can be combined arbitrarily. In particular, the content of the antioxidant (D) is preferably 0.01% by mass to 5% by mass, more preferably 0.05% by mass to 3% by mass, and even more preferably 0.1% by mass to 1% by mass.

<Additives>

The refrigerator oil composition according to an embodiment of the present invention may further contain an additive(s) as long as the effect of the present invention is not impaired.

In particular, the refrigerator oil composition preferably contains at least one selected from the group consisting of an oxygen scavenger, a copper deactivator, an antifoaming agent, and a viscosity index improver, more preferably at least an antioxidant as an additive from the viewpoint of enhancing the stability of the refrigerator oil composition.

Either a single agent or a combination of two or more agents may be used as each additive.

The total content of such additives is preferably 0% by mass to 10% by mass, more preferably 0.01% by mass to 5% by mass, and even more preferably 0.1% by mass to 3% by mass based on the total amount (100% by mass) of the refrigerator oil composition.

(Oxygen Scavenger)

The oxygen scavenger includes an unsaturated aliphatic compound and a terpene having a double bond.

The unsaturated aliphatic compound is preferably an unsaturated hydrocarbon specifically including an olefin, and a polyene such as a diene or a triene. The olefin is preferably an α-olefin such as 1-tetradecene, 1-hexadecene, or 1-octadecene from the viewpoint of reactivity with oxygen.

An unsaturated aliphatic alcohol having conjugated double bonds, such as vitamin A ((2E,4E,6E,8E)-3,7-dimethyl-9-(2,6,6-trimethylcyclohex-1-yl) nona-2,4,6,8-tetraen-1-ol) having the molecular formula $C_{20}H_{30}O$, is also preferred as the unsaturated aliphatic compound from the viewpoint of reactivity with oxygen.

The terpene having a double bond is preferably a terpene-based hydrocarbon having a double bond and, from the viewpoint of reactivity with oxygen, is more preferably α-farnesene ($C_{15}H_{24}$: 3,7,11-trimethyldodeca-1,3,6,10-tetraene) or β-farnesene ($C_{15}H_{24}$: 7,11-dimethyl-3-methylidenedodeca-1,6,10-triene).

(Copper Deactivator)

The copper deactivator includes an N—[N,N'-dialkyl (each alkyl group having 3 to 12 carbon atoms) aminomethyl]triazole.

(Antifoaming Agent)

The antifoaming agent includes a silicone antifoaming agent such as a silicone oil or a fluorinated silicone oil.

(Viscosity Index Improver)

The viscosity index improver includes a polymethacrylate, a polyisobutylene, an ethylene-propylene copolymer, and a hydrogenated styrene-diene copolymer.

[Method for Producing the Refrigerator Oil Composition of the Present Invention]

There is no particular limitation on a method for producing the refrigerator oil composition of the present invention.

For example, a method for producing the refrigerator oil composition according to an embodiment of the present invention is a method for producing a refrigerator oil composition for use with a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bond], the method comprising mixing a base oil (A), a phosphorus-based extreme pressure agent (B), a decomposition inhibitor (C) that inhibits the decomposition of the unsaturated fluorinated hydrocarbon compound in the presence of iron, and an antioxidant (D), wherein the decomposition inhibitor (C) is a compound which controls the amount of fluorine in the refrigerator oil composition at 30 ppm by mass or less after mixing the refrigerator oil composition and R1234yf at a mass ratio of 1:1, and subjecting the mixture to an autoclave test at 175° C. for 336 hours in the presence of a metal catalyst consisting of iron, copper, and aluminum.

There is no particular limitation on a method for mixing the above components. An exemplary method includes a step of adding the phosphorus-based extreme pressure agent (B), the decomposition inhibitor (C), and the antioxidant (D) to the base oil (A). The phosphorus-based extreme pressure agent (B), the decomposition inhibitor (C), and the antioxidant (D) may be added to the base oil (A) either simultaneously or separately. The same holds true for the addition of components other than the phosphorus-based extreme pressure agent (B), the decomposition inhibitor (C), and the antioxidant (D). Each component may be added in the form of a solution (dispersion) e.g. in a diluent oil. After adding the components to the base oil (A), the mixture is preferably stirred by a known method to disperse the components uniformly.

[Properties of the Refrigerator Oil Composition of the Present Invention]

The refrigerator oil composition of the present invention or the refrigerator oil composition according to an embodiment of the present invention has the following property values after the autoclave test described in Examples below.

<Amount of Fluorine>

The amount of fluorine in the refrigerator oil composition after the autoclave test described in Examples below is 30 ppm by mass or less, preferably 25 ppm by mass or less, more preferably 20 ppm by mass or less, even more preferably 15 ppm by mass or less, and still more preferably 10 ppm by mass or less based on the total amount of the refrigerator oil composition.

<Acid Number>

The acid number of the refrigerator oil composition after the autoclave test described in Examples below is preferably 0.30 mgKOH/g or less, more preferably 0.25 mgKOH/g or less, and even more preferably 0.21 mgKOH/g or less.

[Mixed Composition for Refrigerator]

The refrigerator oil composition of the present invention is to be mixed with a refrigerant, and the mixture is to be used as a mixed composition for a refrigerator.

Thus, the mixed composition for a refrigerator according to the present invention comprises the refrigerator oil composition of the present invention and a refrigerant.

The refrigerant for use in the present invention will now be described.

<Refrigerant>

The refrigerant for use in the present invention is a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bond].

The general formula (1) indicates the types and numbers of elements in the molecule, and specifically indicates an unsaturated fluorinated hydrocarbon compound having 2 to 6 carbon atoms C. An unsaturated fluorinated hydrocarbon compound having 2 to 6 carbon atoms has physical and chemical properties, such as a boiling point, a freezing point and a latent heat of vaporization, required for a refrigerant.

In the general formula (1), the type of bonding between the x carbon atoms, represented by $C_x$, includes a carbon-carbon single bond, and an unsaturated bond such as a carbon-carbon double bond. The unsaturated carbon-carbon bond is preferably a carbon-carbon double bond from the viewpoint of stability. The unsaturated fluorinated hydrocarbon compound has at least one, preferably one, unsaturated bond such as a carbon-carbon double bond in the molecule. Thus, at least one of the carbon-carbon bonds between the x carbon atoms, represented by $C_x$, is preferably a carbon-carbon double bond.

A fluoride of a linear or branched chain-like olefin having 2 to 6 carbon atoms, or a fluoride of a cyclic olefin having 4 to 6 carbon atoms, for example, is preferred as the unsaturated fluorinated hydrocarbon compound.

Examples of such unsaturated fluorinated hydrocarbon compounds include an ethylene fluoride having 1 to 3 fluorine atoms introduced, a propene fluoride having 1 to 5 fluorine atoms introduced, a butene fluoride having 1 to 7 fluorine atoms introduced, a pentene fluoride having 1 to 9 fluorine atoms introduced, a hexene fluoride having 1 to 11 fluorine atoms introduced, a cyclobutene fluoride having 1 to 5 fluorine atoms introduced, a cyclopentene fluoride having 1 to 7 fluorine atoms introduced, and a cyclohexene fluoride having 1 to 9 fluorine atoms introduced.

Among them, a propene fluoride is preferred, and a propene having 3 to 5 fluorine atoms introduced is more preferred. In particular, at least one selected from 1,3,3,3-tetrafluoropropene (R1234ze), 2,3,3,3-tetrafluoropropene (R1234yf), and 1,2,3,3-tetrafluoropropene (R1234ye) is preferred, and 2,3,3,3-tetrafluoropropene (R1234yf) is more preferred.

The above-described unsaturated fluorinated hydrocarbon compounds may be used singly or in a combination of two or more. Thus, it is possible to use only one of 1,3,3,3-tetrafluoropropene (R1234ze), 2,3,3,3-tetrafluoropropene (R1234yf), and 1,2,3,3-tetrafluoropropene (R1234ye).

(Other Refrigerant)

In one embodiment of the present invention, the refrigerant may be a mixed refrigerant containing other compound(s), e.g. a saturated fluorinated hydrocarbon compound, in addition to the unsaturated fluorinated hydrocarbon compound represented by the general formula (1).

The saturated fluorinated hydrocarbon compound is preferably a fluoride of an alkane having 1 to 4 carbon atoms, more preferably a fluoride of an alkane having 1 to 3 carbon atoms, and even more preferably a fluoride of an alkane having 1 or 2 carbon atoms (methane or ethane). Examples of the fluoride of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134), and 1,1,1,2,2-pentafluoroethane (R125). Among them, difluoromethane and 1,1,1,2,2-pentafluoroethane are preferred.

These saturated fluorinated hydrocarbon compounds may be used singly or in a combination of two or more.

The refrigerant may contain a natural refrigerant. The natural refrigerant includes a hydrocarbon (HC) refrigerant, carbon dioxide ($CO_2$), and ammonia. These natural refrigerants may be used singly or in a combination of two or more.

The hydrocarbon refrigerant is preferably a hydrocarbon having 1 or more and 8 or less carbon atoms, more preferably a hydrocarbon having 1 or more and 5 or less carbon atoms, and even more preferably a hydrocarbon having 3 or more and 5 or less carbon atoms. When the number of carbon atoms is 8 or less, the boiling point of the refrigerant will not be too high, which is favorable to the refrigerant. Examples of the hydrocarbon refrigerant include methane, ethane, ethylene, propane (R290), cyclopropane, propylene, n-butane, isobutane (R600a), 2-methylbutane, n-pentane, isopentane, cyclopentane, isobutane, and n-butane. These refrigerants may be used singly or in a combination of two or more.

(Content of Unsaturated Fluorinated Hydrocarbon Compound in Refrigerant)

In the present invention, the refrigerant comprises the unsaturated fluorinated hydrocarbon compound represented by the general formula (1).

The content of the unsaturated fluorinated hydrocarbon compound represented by the general formula (1) is preferably 50% by mass to 100% by mass, more preferably 60% by mass to 100% by mass, even more preferably 70% by mass to 100% by mass, still more preferably 80% by mass to 100% by mass, yet more preferably 90% by mass to 100% by mass, and yet more preferably 100% by mass based on the total amount of the refrigerant.

(Amounts of Refrigerant and Refrigerator Oil Composition)

In the mixed composition for a refrigerator according to an embodiment of the present invention, the amounts of the refrigerant and the refrigerator oil composition, expressed in terms of the mass ratio "refrigerator oil composition/refrigerant", is preferably 1/99 to 90/10, more preferably 5/95 to 70/30. When the mass ratio "refrigerator oil composition/refrigerant" is within the above range, the mixed composition can exhibit good lubricating performance and good refrigerating capacity in a refrigerator.

[Properties of the Mixed Composition for a Refrigerator of the Present Invention]

<Wear Resistance>

The mixed composition for a refrigerator according to an embodiment of the present invention preferably exhibits an amount of wear, as measured by the method described in Examples below, of 10 mg or less, more preferably 5.0 mg or less, and even more preferably 3.0 mg or less.

[Application of the Refrigerator Oil Composition and the Mixed Composition for a Refrigerator of the Present Invention]

The refrigerator oil composition and the mixed composition for a refrigerator of the present invention are preferably used, for example, in an air conditioner, a refrigerator, a vending machine, a showcase, a refrigerating system, a hot-water supply system, or a heating system. Examples of the air conditioner include an automotive air conditioner such as an open-type automotive air conditioner or an electric automotive air conditioner; and a gas heat pump (GHP) air conditioner.

Embodiments of the Present Invention Provided

Embodiments of the present invention provide the following [1] to [13].

[1] A refrigerator oil composition for use with a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bond], the composition comprising: a base oil (A); a phosphorus-based extreme pressure agent (B); a decomposition inhibitor (C) that inhibits the decomposition of the unsaturated fluorinated hydrocarbon compound in the presence of iron; and an antioxidant (D), wherein the decomposition inhibitor (C) is a compound which controls the amount of fluorine in the refrigerator oil composition at 30 ppm by mass or less after mixing the refrigerator oil composition and R1234yf at a mass ratio of 1:1, and subjecting the mixture to an autoclave test at 175° C. for 336 hours in the presence of a metal catalyst consisting of iron, copper, and aluminum.

[2] The refrigerator oil composition as set forth in [1], wherein the decomposition inhibitor (C) is at least one selected from the group consisting of an organic metal salt (C1), an inorganic metal salt (C2), a nitrogen-containing organic compound (C3), and a sorbitan fatty acid ester (C4).

[3] The refrigerator oil composition as set forth in [2], wherein the organic metal salt (C1) is a metal salicylate.

[4] The refrigerator oil composition as set forth in [2] or [3], wherein the inorganic metal salt (C2) is a borate.

[5] The refrigerator oil composition as set forth in any one of [2] to [4], wherein the nitrogen-containing organic compound (C3) is a nitrogen-containing organic compound having at least one hydroxy group.

[6] The refrigerator oil composition as set forth in any one of [2] to [5], wherein the sorbitan fatty acid ester (C4) is a partial ester of sorbitan and a fatty acid.

[7] The refrigerator oil composition as set forth in any one of [1] to [6], wherein the content ratio of the phosphorus-based extreme pressure agent (B) to the decomposition inhibitor (C) [(B)/(C)], expressed in mass ratio, is 5 to 200.

[8] The refrigerator oil composition as set forth in any one of [1] to [7], wherein the content of the decomposition inhibitor (C) is 0.001% by mass to 0.50% by mass based on the total amount of the refrigerator oil composition.

[9] The refrigerator oil composition as set forth in any one of [1] to [7], wherein the base oil (A) comprises at least one selected from the group consisting of a polyalkylene glycol, a polyvinyl ether, a copolymer of a poly(oxy)alkylene glycol or its monoether and a polyvinyl ether, a polyol ester, and a mineral oil.

The refrigerator oil composition as set forth in any one of [1] to [9], wherein the unsaturated fluorinated hydrocarbon compound comprises at least one selected from the group consisting of R1234ze, R1234yf, and R1234ye.

The refrigerator oil composition as set forth in any one of [1] to [10], wherein the refrigerant consists solely of the unsaturated fluorinated hydrocarbon compound.

A mixed composition for a refrigerator, comprising: a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bond]; and the refrigerator oil composition as set forth in any one of [1] to [9].

A method for producing a refrigerator oil composition for use with a refrigerant comprising at least one unsaturated fluorinated hydrocarbon compound selected from compounds represented by the following general formula (1): $C_xF_yH_z$ (1) [where x is an integer of 2 to 6, y is an integer of 1 to 11, and z is an integer of 1 to 11, and the molecule has at least one unsaturated carbon-carbon bond], the method comprising mixing a base oil (A), a phosphorus-based extreme pressure agent (B), a decomposition inhibitor (C) that inhibits the decomposition of the unsaturated fluorinated hydrocarbon compound in the presence of iron, and an antioxidant (D), wherein the decomposition inhibitor (C) is a compound which controls the amount of fluorine in the refrigerator oil composition at 30 ppm by mass or less after mixing the refrigerator oil composition and R1234yf at a mass ratio of 1:1, and subjecting the mixture to an autoclave test at 175° C. for 336 hours in the presence of a metal catalyst consisting of iron, copper, and aluminum.

EXAMPLES

The following examples illustrate the present invention in greater detail and are not intended to limit the scope of the invention.

[Methods for Measuring Properties]

The following methods were used to measure the below-described properties of raw materials and the lubricating oil compositions of Examples and Comparative Example.

(1) 40° C. Kinematic Viscosity

The 40° C. kinematic viscosity of a base oil (A) used in the Examples and Comparative Example was measured according to JIS K 2283:2000.

(2) Base Number

The base number of calcium salicylate, which was used as a decomposition inhibitor (C), was measured by the potentiometric titration method (base number/perchloric acid method) according to JIS K 2501:2003 (9).

<Details of Components Used in the Preparation of Refrigerator Oil Compositions>

The following are details of components that were used in the preparation of the refrigerator oil compositions.

(1) Base Oil (A)

PAG (polyoxypropylene glycol monomethyl ether, 40° C. kinematic viscosity: 49 mm$^2$/s) was used.

(2) Phosphate Ester (B)

Tricresyl phosphate (phosphorus atom content: 8.4 mass %) was used.

(3) Decomposition Inhibitor (C)

The following organic metal salt (C1)-1, organic metal salt (C1)-2, inorganic metal salt (C2), nitrogen-containing organic compound (C3) and sorbitan fatty acid ester (C4) were used as decomposition inhibitors (C).

Organic metal salt (C1)-1: calcium salicylate 1 (product name "Infineum M7125", manufactured by Infineum Japan Ltd., calcium content: 12.5 mass %, base number: 350 mgKOH/g).

Organic metal salt (C1)-2: calcium salicylate 2 (product name "Infineum M7121", manufactured by Infineum Japan Ltd., calcium content: 8.0 mass %, base number: 225 mgKOH/g)

Inorganic metal salt (C2): sodium borate (manufactured by FUJIFILM Wako Pure Chemical Corporation)

Nitrogen-containing organic compound (C3): 8-quinolinol (manufactured by FUJIFILM Wako Pure Chemical Corporation)

Sorbitan fatty acid ester (C4): sorbitan oleate (product name "NIKKOL R-601", manufactured by Nippon Surfactant Industries Co., Ltd., sorbitan monooleate: sorbitan dioleate:sorbitan trioleate=52:37:5 (mass ratio))

(4) Antioxidant (D)

Di-tert-butyl-p-cresol (DBPC) was used as an antioxidant (D).

Examples 1 to 10 and Comparative Example 1

The above components were mixed to prepare refrigerator oil compositions with the formulations shown in Table 1. The refrigerator oil compositions were subjected to the below-described autoclave test and sealed Falex wear test.

The unit of the numerical values for the formulations shown in Table 1 is "mass %".

<Autoclave Test>

An autoclave test was performed according to JIS K 2211:2009 Appendix C. In particular, a mixed composition for a refrigerator (moisture content 500 ppm), which is a mixture of 20 g of R1234yf and 20 g of each of the refrigerator oil compositions of Examples 1 to 10 and Comparative Example 1, and a metal catalyst consisting of iron, copper, and aluminum were placed into an autoclave having an interior volume of 200 mL. The autoclave was then evacuated until the amount of residual air became 25 mL, and held at 175° C. for 336 hours. Thereafter, the amount of fluorine in the refrigerator oil composition ("post-test fluorine amount in oil" in Table 1) and the acid number of the refrigerator oil composition ("post-test acid number" in Table 1) were evaluated by the below-described methods.

Further, from the viewpoint of evaluating corrosion of an iron sliding portion, discoloration of the iron catalyst of the metal catalyst was evaluated.

(Evaluation of the Amount of Fluorine in Refrigerator Oil Composition)

The refrigerant was separated from each mixed composition for a refrigerator after the autoclave test, and the amount of fluorine in the refrigerator oil composition was measured according to JIS K 0127:2013 (General Rule for Ion Chromatography Analysis).

(Evaluation of Acid Number of Refrigerator Oil Composition)

The acid number of the refrigerator oil composition was measured by the indicator photometric titration method according to JIS K 2501:2003 (see Appendix 1 of the JIS standard).

<Sealed Falex Wear Test>

The following pin and block were provided.

Pin: SAE-3155

Block: AISI-1137

Using a Falex test machine, the following test was conducted according to ASTM D2670.

The pin and the block were set in the Falex test machine, and 300 g of each refrigerator oil composition as an evaluation object and 30 g of R1234yf as a refrigerant were filled into a test container, and the test container was hermetically sealed. Thereafter, the test machine was operated for 120 minutes under the set conditions of: a rotating speed of 0.09 m/s, an oil temperature of 60° C. and a load of 1,779 N. The total amount of wear (mg) of the pin and the block was then measured.

The wear test results were evaluated according to the following criteria. A smaller amount of wear (mg) indicates superior wear resistance.

Rating S (pass): 3.0 mg or less.

Rating A (pass): more than 3.0 mg and 5.0 mg or less

Rating B (pass): more than 5.0 mg and less than 10 mg

Rating C (fail): 10 mg or more

|  |  |  |  | Unit | Ex. 1 | Ex. 2 | Ex. 3 | Ex. 4 | Ex. 5 | Ex. 6 |
|---|---|---|---|---|---|---|---|---|---|---|
| Refrigerator oil composition | Base oil (A) | PAG | | mass % | 98.69 | 98.60 | 98.69 | 98.60 | 98.69 | 98.60 |
| | Phosphate ester (B) | Tricresyl phosphate | | mass % | 1.00 | 1.00 | 1.00 | 1.00 | 1.00 | 1.00 |
| | Decomposition inhibitor (C) | Organic metal salt (C1)-1 | Calcium salicylate 1 | mass % | 0.01 | 0.10 | — | — | — | — |
| | | Organic metal salt (C1)-2 | Calcium salicylate 2 | mass % | — | — | 0.01 | 0.10 | — | — |

-continued

|  |  |  | Unit | | | | | | |
|---|---|---|---|---|---|---|---|---|---|
| | Inorganic metal salt (C2) | Sodium borate | mass % | — | — | — | — | 0.01 | 0.10 |
| | Nitrogen-containing organic compound (C3) | 8-quinolinol | mass % | — | — | — | — | — | — |
| | Sorbitan fatty acid ester (C4) | Sorbitan oleate | mass % | — | — | — | — | — | — |
| Antioxidant (D) | | DBPC | mass % | 0.30 | 0.30 | 0.30 | 0.30 | 0.30 | 0.30 |
| | Total | | mass % | 100 | 100 | 100 | 100 | 100 | 100 |
| | (B)/(C) | | — | 100 | 10 | 100 | 10 | 100 | 10 |
| Evaluation results | Autoclave test | Post-test fluorine amount in oil | mass ppm | 6 | 8 | 15 | 13 | 12 | 5 |
| | | Post-test acid number | mgKOH/g | 0.16 | 0.17 | 0.18 | 0.14 | 0.13 | 0.12 |
| | | Post-test discoloration of iron catalyst | — | No | No | No | No | No | No |
| | Sealed Falex wear test | Total amount of wear mg | mg | 2.4 | 2.1 | 3.7 | 2.9 | 4.5 | 2.4 |
| | | Rating | — | S | S | A | S | A | S |

|  |  |  | Unit | Ex. 7 | Ex. 8 | Ex. 9 | Ex. 10 | Comp. Ex. 1 |
|---|---|---|---|---|---|---|---|---|
| Refrigerator oil composition | Base oil (A) | PAG | mass % | 98.69 | 98.60 | 98.69 | 98.60 | 98.70 |
| | Phosphate ester (B) | Tricresyl phosphate | mass % | 1.00 | 1.00 | 1.00 | 1.00 | 1.00 |
| Decomposition inhibitor (C) | Organic metal salt (C1)-1 | Calcium salicylate 1 | mass % | — | — | — | — | — |
| | Organic metal salt (C1)-2 | Calcium salicylate 2 | mass % | — | — | — | — | — |
| | Inorganic metal salt (C2) | Sodium borate | mass % | — | — | — | — | — |
| | Nitrogen-containing organic compound (C3) | 8-quinolinol | mass % | 0.01 | 0.10 | — | — | — |
| | Sorbitan fatty acid ester (C4) | Sorbitan oleate | mass % | — | — | 0.01 | 0.10 | — |
| Antioxidant (D) | | DBPC | mass % | 0.30 | 0.30 | 0.30 | 0.30 | 0.30 |
| | Total | | mass % | 100 | 100 | 100 | 100 | 100 |
| | (B)/(C) | | — | 100 | 10 | 100 | 10 | — |
| Evaluation results | Autoclave test | Post-test fluorine amount in oil | mass ppm | 17 | 3 | 16 | 10 | 33 |
| | | Post-test acid number | mgKOH/g | 0.10 | 0.06 | 0.20 | 0.09 | 0.34 |
| | | Post-test discoloration of iron catalyst | — | No | No | No | No | Found |
| | Sealed Falex wear test | Total amount of wear mg | mg | 6.1 | 1.9 | 6.8 | 4.8 | 12.6 |
| | | Rating | — | B | S | B | A | C |

The data in Table 1 indicates the following.

The refrigerator oil compositions of Examples 1 to 10, each containing a decomposition inhibitor (C) and having a fluorine content of less than 30 ppm by mass after the autoclave test, have excellent wear resistance. Further, the compositions favorably have a low acid number. In addition, no discoloration of the iron catalyst was observed.

On the other hand, the refrigerator oil composition of Comparative Example 1, containing no decomposition inhibitor (C) and having a fluorine content of more than 30 ppm by mass after the autoclave test, has poor wear resistance. Further, the composition unfavorably has a high acid number. In addition, discoloration of the iron catalyst was observed.

The invention claimed is:

1. A mixed composition for a refrigerator, comprising:
   a refrigerant consisting of an unsaturated fluorinated hydrocarbon compound having the formula $C_xF_yH_z$, where x is an integer of 2 to 6, y is an integer of 1 to 11, and z is an integer of 1 to 11, and the compound has at least one unsaturated carbon-carbon bond; and
   a refrigerator oil composition, comprising:
   a base oil (A);
   a phosphorus-based extreme pressure agent (B);

a decomposition inhibitor (C) that inhibits the decomposition of an unsaturated fluorinated hydrocarbon compound in the presence of an iron; and
an antioxidant (D),
wherein the decomposition inhibitor (C) is a compound which controls the amount of fluorine in the refrigerator oil composition at 30 ppm by mass or less after mixing the refrigerator oil composition and R1234yf at a mass ratio of 1:1, and subjecting the mixture to an autoclave test at 175° C. for 336 hours in the presence of a metal catalyst consisting of iron, copper, and aluminum, and
wherein the decomposition inhibitor (C) is at least one selected from the group consisting of perbasic calcium salicylate, sodium borate, and 8-quinolinol,
wherein the content of the decomposition inhibitor (C) is 0.001% by mass to 0.50% by mass based on the total amount of the refrigerator oil composition.

2. The mixed composition according to claim 1, wherein the content ratio of the phosphorus-based extreme pressure agent (B) to the decomposition inhibitor (C)[(B)/(C)], expressed in mass ratio, is 5 to 200.

3. The mixed composition according to claim 1, wherein the content of the decomposition inhibitor (C) is 0.1% by mass to 0.15% by mass based on the total amount of the refrigerator oil composition.

4. The mixed composition according to claim 1, wherein the base oil (A) comprises at least one selected from the group consisting of a polyalkylene glycol, a polyvinyl ether, a copolymer of a poly(oxy)alkylene glycol or its monoether and a polyvinyl ether, a polyol ester, and a mineral oil.

5. The mixed composition according to claim 1, wherein the unsaturated fluorinated hydrocarbon compound comprises at least one selected from the group consisting of R1234ze, R1234yf, and R1234ye.

6. The mixed composition according to claim 2, wherein the content ratio of the phosphorus-based extreme pressure agent (B) to the decomposition inhibitor (C) [(B)/(C)], expressed in mass ratio, is 5 to 110.

7. The mixed composition according to claim 4, wherein the base oil (A) comprises polyalkylene glycol.

8. The mixed composition according to claim 1, wherein the phosphorus-based extreme pressure agent (B) comprises at least one selected from the group consisting of a phosphate ester, an acid phosphate ester, a phosphite ester, a hydrogenphosphite ester, and an amine salt of a phosphate ester compound.

9. The mixed composition according to claim 8, wherein the phosphorus-based extreme pressure agent (B) comprises a phosphate ester.

10. The mixed composition according to claim 9, wherein the phosphate ester comprises tricresyl phosphate.

11. The mixed composition according to claim 1, wherein a mass ratio of the refrigerator oil composition to the refrigerant is in a range of from 1/99 to 90/10.

12. The mixed composition according to claim 11, wherein a mass ratio of the refrigerator oil composition to the refrigerant is in a range of from 5/95 to 70/30.

13. The mixed composition according to claim 1, which does not contain a sorbitan fatty acid ester.

* * * * *